(12) United States Patent
Nagai et al.

(10) Patent No.: US 12,488,942 B2
(45) Date of Patent: Dec. 2, 2025

(54) ELECTRONIC COMPONENT HAVING ELEMENT BODY AND INTERNAL CONDUCTORS AND ELECTRONIC COMPONENT DEVICE

(71) Applicant: TDK Corporation, Tokyo (JP)

(72) Inventors: Yuichi Nagai, Tokyo (JP); Ken Morita, Tokyo (JP); Kyohei Takata, Tokyo (JP); Yasuhiro Okui, Tokyo (JP); Yoshitaka Nagashima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 139 days.

(21) Appl. No.: 18/522,738

(22) Filed: Nov. 29, 2023

(65) Prior Publication Data
US 2024/0258036 A1    Aug. 1, 2024

(30) Foreign Application Priority Data
Jan. 31, 2023   (JP) .................................. 2023-013061

(51) Int. Cl.
*H01G 4/232* (2006.01)
*H01G 4/248* (2006.01)
*H01G 4/30* (2006.01)

(52) U.S. Cl.
CPC .......... *H01G 4/2325* (2013.01); *H01G 4/248* (2013.01); *H01G 4/30* (2013.01)

(58) Field of Classification Search
CPC ........ H01G 4/2325; H01G 4/248; H01G 4/30; H01G 4/012; H01G 4/12; H01G 4/232;
(Continued)

(56) References Cited

U.S. PATENT DOCUMENTS

| 2009/0229871 A1* | 9/2009 | Togashi | ............... | H05K 1/0231 361/302 |
| 2010/0008017 A1* | 1/2010 | Ito | .......................... | H01G 4/30 361/301.4 |

(Continued)

FOREIGN PATENT DOCUMENTS

JP         2018-006501 A      1/2018

*Primary Examiner* — Timothy J. Dole
*Assistant Examiner* — Daniel M Dubuisson
(74) *Attorney, Agent, or Firm* — Oliff PLC

(57) ABSTRACT

An electronic component includes: an element body including first and second end surfaces opposing each other and a side surface coupling the first and second end surfaces; first and second internal conductors in the element body; a first external electrode on the first end surface; a second external electrode on the second end surface; and first and second external conductors on the side surface. The first and second external conductors are separated from the first and second external electrodes. The first internal conductor is electrically connected to the first external electrode and the first external conductor. The second internal conductor is electrically connected to the second external electrode and the second external conductor. The first external conductor is located between the first external electrode and the second external conductor. The second external conductor is located between the second external electrode and the first external conductor.

14 Claims, 25 Drawing Sheets

(58) Field of Classification Search
CPC .......... H01C 7/021; H01C 7/041; H01C 7/18; H01F 3/02; H01F 17/0013; H01M 10/0585; H10N 30/50
See application file for complete search history.

(56) References Cited

U.S. PATENT DOCUMENTS

| | | | |
|---|---|---|---|
| 2010/0188799 A1* | 7/2010 | Galvagni | H01G 4/30 |
| | | | 361/306.3 |
| 2012/0194965 A1* | 8/2012 | Kuroda | H05K 3/3442 |
| | | | 361/782 |
| 2017/0229245 A1* | 8/2017 | Nakazawa | H01G 4/012 |
| 2019/0131070 A1* | 5/2019 | Onodera | H01G 4/30 |
| 2019/0131072 A1* | 5/2019 | Onodera | H01G 4/012 |
| 2019/0164696 A1* | 5/2019 | Onodera | H01G 4/008 |
| 2019/0237261 A1* | 8/2019 | Onodera | H01G 2/06 |
| 2021/0125783 A1* | 4/2021 | Onodera | H01G 4/012 |
| 2024/0222027 A1* | 7/2024 | Han | H01G 4/224 |

* cited by examiner

ELECTRONIC COMPONENT HAVING ELEMENT BODY AND INTERNAL CONDUCTORS AND ELECTRONIC COMPONENT DEVICE

CROSS-REFERENCE TO RELATED APPLICATIONS

This application is based upon and claims the benefit of priority from Japanese Patent Application No. 2023-013061, filed on Jan. 31, 2023. The entire contents of which are incorporated herein by reference.

BACKGROUND

Field

The present disclosure relates to an electronic component or an electronic component device.

Description of the Related Art

Known electronic components include an element body, a plurality of internal conductors in the element body, and a plurality of external electrodes on the element body (see, for example, Japanese Unexamined Patent Publication No. 2018-006501). Each of the plurality of internal conductors is connected to a corresponding external electrode of the plurality of external electrodes. Each of the plurality of external electrodes includes a conductive resin layer.

SUMMARY

The conductive resin layer includes, for example, a plurality of metal particles and a resin. In a configuration in which the external electrode includes the conductive resin layer, migration may occur in the external electrode. The conductive resin layer is an example of an electrode layer in which migration is relatively prone to occur.

Migration is considered to occur due to the following events, for example.

An electric field acts on the electrode layer, and metal included in the electrode layer is ionized. Generated metal ion is attracted by an electric field between the external electrodes and migrates from the electrode layer. The electric field acting on the metal includes, for example, an electric field between the external electrodes or an electric field between the external electrode and an internal conductor in the element body. The metal ion migrating from the electrode layer react with, for example, an electron supplied from the internal conductor or the external electrode, and is deposited as metal on a surface of the element body.

One aspect of the present disclosure provides an electronic component reducing occurrence of migration. Another aspect of the present disclosure provides an electronic component device reducing occurrence of migration.

An electronic component according to one aspect of the present disclosure includes: an element body including a first end surface and a second end surface opposing each other and a side surface coupling the first end surface and the second end surface; a plurality of internal conductors in the element body; a first external electrode on the first end surface and a second external electrode on the second end surface; and a first external conductor and a second external conductor disposed in a direction in which the first end surface and the second end surface oppose each other and separated from the first external electrode and the second external electrode, on the side surface. Each of the first external electrode and the second external electrode includes an electrode layer in which migration is relatively prone to occur. Each of the first external conductor and the second external conductor includes a conductor layer in which migration is less prone to occur than in the electrode layer. The plurality of internal conductors includes a first internal conductor electrically connected to the first external electrode and the first external conductor and a second internal conductor electrically connected to the second external electrode and the second external conductor. The first external conductor is located between the first external electrode and the second external conductor. The second external conductor is located between the second external electrode and the first external conductor.

In the one aspect described above, the electrode layer included in the first external electrode and the conductor layer included in the first external conductor are electrically connected to each other, and the electrode layer included in the second external electrode and the conductor layer included in the second external conductor are electrically connected to each other. When an electric field acts on the electrode layer, the electric field acts not only on the electrode layer but also on the conductor layer electrically connected to the electrode layer. The electric field tends not to be concentrated on the electrode layer, and the conductor layer reduces the electric field acting on the electrode layer. Therefore, even when an electric field acts on the electrode layer, metal included in the electrode layer tends not to be ionized. Migration tends not to occur in the electrode layer.

The first external conductor is located between the first external electrode and the second external conductor. The electrode layer included in the first external electrode and the conductor layer included in the first external conductor are electrically connected to each other. Therefore, when migration occurs in the electrode layer included in the first external electrode, the first external conductor prevents the migration from proceeding.

The second external conductor is located between the second external electrode and the first external conductor. The electrode layer included in the second external electrode and the conductor layer included in the second external conductor are electrically connected to each other. Therefore, when migration occurs in the electrode layer included in the second external electrode, the second external conductor prevents the migration from proceeding.

Consequently, the one aspect described above prevents the migration from proceeding.

In the one aspect described above, the element body may have a rectangular parallelepiped shape, and the side surface may include a first side surface, a second side surface, a third side surface, and a fourth side surface that are adjacent to the end surface and the second end surface. The first external conductor and the second external conductor may be disposed over the first side surface, the second side surface, the third side surface, and the fourth side surface.

A configuration in which the first external conductor and the second external conductor are disposed over the first side surface, the second side surface, the third side surface, and the fourth side surface reliably prevents the migration from proceeding.

In the one aspect described above, the first side surface and the second side surface may oppose each other. The first internal conductor may be physically connected to a portion included in the first external conductor and located on the first side surface. The second internal conductor may be physically connected to a portion included in the second external conductor and located on the second side surface.

In the one aspect described above, the first internal conductor may be physically connected to a portion included in the first external conductor and located on the first side surface. The second internal conductor may be physically connected to a portion included in the second external conductor and located on the first side surface.

In the one aspect described above, the first internal conductor may be connected to the first external conductor at a plurality of portions of the first internal conductor. The second internal conductor may be connected to the second external conductor at a plurality of portions of the second internal conductor.

A configuration in which the first internal conductor is connected to the first external conductor at the plurality of portions of the first internal conductor and the second internal conductor is connected to the second external conductor at the plurality of portions of the second internal conductor reliably prevents the migration from proceeding.

In the one aspect described above, a first shortest distance between the first external electrode and the first external conductor and a second shortest distance between the second external electrode and the second external conductor may be smaller than a shortest distance between the first external conductor and the second external conductor.

A configuration in which the first shortest distance and the second shortest distance are smaller than the shortest distance between the first external conductor and the second external conductor reduces a progress distance of the migration, even when the migration occurs in the electrode layer. Therefore, the first external electrode and the second external electrode tend not to be short-circuited.

In the one aspect described above, the side surface may include a first main surface arranged to include a mounting surface, a second main surface opposing the first main surface, and a pair of side surfaces that are adjacent to the first main surface, the second main surface, the first end surface, and the second end surface and oppose each other. The electrode layer may include a conductive resin layer continuously covering a part of the main surface, a part of a corresponding end surface of the first end surface and the second end surface, and a part of each of the pair of side surfaces. The first internal conductor may oppose the second internal conductor in a direction in which the pair of side surfaces oppose each other, and may be physically connected to a portion included in the first external conductor and located on the first main surface. The second internal conductor may be physically connected to a portion included in the second external conductor and located on the first main surface.

A configuration in which the conductive resin layer covers the part of the corresponding end surface decreases ESR (equivalent series resistance), as compared with a configuration in which a conductive resin layer covers an entire corresponding end surface.

A configuration in which the first internal conductor is physically connected to the portion, of the first external conductor, on the first main surface and the second internal conductor is physically connected to the portion, of the second external conductor, on the first main surface reliably prevents the migration from proceeding from the conductive resin layer, even in a configuration in which the first internal conductor opposes the second internal conductor in the direction in which the pair of side surfaces oppose each other.

In the one aspect described above, the side surface may include a first main surface arranged to include a mounting surface, a second main surface opposing the first main surface, and a pair of side surfaces that are adjacent to the first main surface, the second main surface, the first end surface, and the second end surface and oppose each other. The electrode layer may include a conductive resin layer continuously covering a part of the main surface, a part of a corresponding end surface of the first end surface and the second end surface, and a part of each of the pair of side surfaces. The first internal conductor may oppose the second internal conductor in a direction in which the first main surface and the second main surface oppose each other, and may be physically connected to a portion included in the first external conductor and located on at least one side surface of the pair of side surfaces. The second internal conductor may be physically connected to a portion included in the second external conductor and located on at least one side surface of the pair of side surfaces.

A configuration in which the conductive resin layer covers the part of the corresponding end surface decreases ESR, as compared with a configuration in which a conductive resin layer covers an entire corresponding end surface.

A configuration in which the first internal conductor is physically connected to the portion, of the first external conductor, on the at least one side surface and the second internal conductor is physically connected to the portion, of the second external conductor, on the at least one side surface reliably prevents the migration from proceeding from the conductive resin layer, even in a configuration in which the first internal conductor opposes the second internal conductor in the direction in which the first main surface and the second main surface oppose each other.

In the one aspect described above, an internal conductor, among the plurality of internal conductors, between the second main surface and an end edge included in the conductive resin layer and located closer to the second main surface, in the direction in which the first main surface and the second main surface oppose each other, may be not electrically connected to either the first external conductor or the second external conductor.

In the one aspect described above, each of the first external conductor and the second external conductor may be disposed over the first main surface and a portion of each of the pair of side surfaces.

A configuration in which each of the first external conductor and the second external conductor is disposed over the first main surface and the portion of each of the pair of side surfaces realizes easy formation of the first external conductor and the second external conductor, and reliably prevents the migration from proceeding.

In the one aspect described above, a first height of a portion included in each of the first external conductor and the second external conductor and located on the portion of each of the pair of side surfaces in a direction orthogonal to the first main surface may be larger than or equal to a second height of the conductive resin layer in the direction orthogonal to the first main surface.

A configuration in which the first height is larger than or equal to the second height reliably prevents the migration from proceeding.

In the one aspect described above, the electrode layer may include a conductive resin layer including a plurality of silver particles. The conductor layer may include a metal layer in which migration is less prone to occur than in silver.

A configuration in which the conductor layer includes the metal layer in which migration is less prone to occur than in silver reliably prevents the migration from proceeding, even in a configuration in which the conductive resin layer, of the electrode layer, includes the plurality of silver particles.

An electronic component device according to another aspect of the present disclosure includes: the electronic component according to the one aspect described above; and an electronic device on which the electronic component is mounted. The first external conductor and the second external conductor are not physically connected to the electronic device.

As described above, the other aspect described above prevents the migration from proceeding in the electronic component.

In the other aspect described above, the first external conductor and the second external conductor are not physically connected to the electronic device. Therefore, when an external force acts on the electronic component from the electronic device, the external force does not act on the element body through the first external conductor and the second external conductor.

The electronic device does not need to include a land pattern to which the first outer conductor and the second outer conductor are physically connected. Therefore, the other aspect described above prevents a configuration of the electronic device from being complicated.

DETAILED DESCRIPTION

In the following description, with reference to the drawings, the same reference numbers are assigned to the same components or to similar components having the same function, and overlapping description is omitted.

First Example

Figure 1:
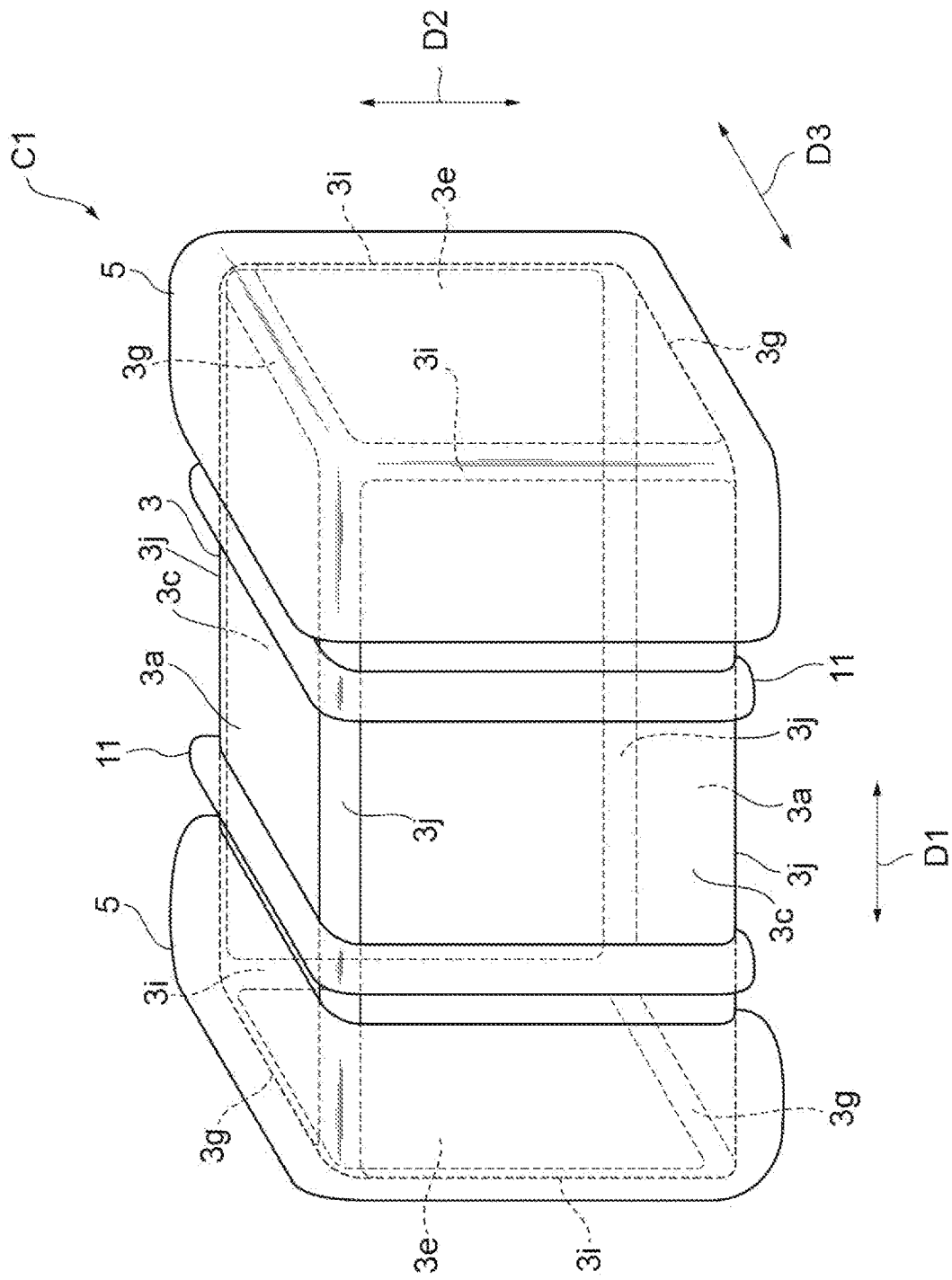
FIG. 1 is a perspective view of a multilayer capacitor according to a first example.

A configuration of a multilayer capacitor C1 according to the first example will be described with reference to FIGS. 1 to 5. FIG. 1 is a perspective view of a multilayer capacitor according to the first example. FIGS. 2, 3, 4, and 5 are views illustrating a cross-sectional configuration of the multilayer capacitor according to the first example.

In the first example, an electronic component includes, for example, the multilayer capacitor C1.

As illustrated in FIG. 1, the multilayer capacitor C1 includes an element body 3 of a rectangular parallelepiped shape, a plurality of external electrodes 5, and a plurality of external conductors 11. For example, the multilayer capacitor C1 includes a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, or a rectangular parallelepiped shape in which the corners and ridges are rounded.

The element body 3 includes a pair of main surfaces 3a opposing each other, a pair of side surfaces 3c opposing each other, and a pair of end surfaces 3e opposing each other. The pair of main surfaces 3a, the pair of side surfaces 3c, and the pair of end surfaces 3e each have a substantially rectangular shape. The pair of main surfaces 3a oppose each other in a second direction D2. The pair of side surfaces 3c oppose each other in a third direction D3. The pair of end surfaces 3e oppose each other in a first direction D1. A direction in which the pair of main surfaces 3a oppose each other includes the second direction D2. A direction in which the pair of side surfaces 3c oppose each other includes the third direction D3. A direction in which the pair of end surfaces 3e oppose each other includes the first direction D1. The multilayer capacitor C1 is solder-mounted on an electronic device. The electronic device includes, for example, a circuit board or an electronic component. In the multilayer capacitor C1, for example, the main surface 3a or the side surface 3c opposes the electronic device. The main surface 3a or the side surface 3c is arranged to constitute a mounting surface. The main surface 3a or the side surface 3c is the mounting surface.

The second direction D2 includes a direction orthogonal to the main surfaces 3a, and is orthogonal to the third direction D3. The second direction D2 includes a direction intersecting the main surfaces 3a. The first direction D1 includes a direction parallel to the main surfaces 3a and the side surfaces 3c, and is orthogonal to the second direction D2 and the third direction D3. The third direction D3 is a direction orthogonal to the side surfaces 3c, and the first direction D1 includes a direction orthogonal to the end surfaces 3e. For example, a length of the element body 3 in the first direction D1 is larger than a length of the element body 3 in the second direction D2 and larger than a length of the element body 3 in the third direction D3. The first direction D1 includes a longitudinal direction of the element body 3. The length of the element body 3 in the second direction D2 and the length of the element body 3 in the third direction D3 may be equal to each other. The length of the element body 3 in the second direction D2 and the length of the element body 3 in the third direction D3 may be different.

The pair of side surfaces 3c extend in the second direction D2 to couple the pair of main surfaces 3a to each other. The pair of side surfaces 3c also extend in the first direction D1. The pair of end surfaces 3e extend in the second direction D2 to couple the pair of main surfaces 3a to each other. The pair of end surfaces 3e also extend in the third direction D3.

For example, when one end surface 3e includes a first end surface, the other end surface 3e includes a second end surface.

Each of the main surfaces 3a also includes a side surface included in the element body 3. The side surface of the element body 3 includes the pair of main surfaces 3a and the pair of side surfaces 3c. For example, when one side surface 3c includes a first side surface, the other side surface 3c may include a second side surface, one main surface 3a may include a third side surface, and another main surface 3a may include a fourth side surface.

The element body 3 includes four ridge portions 3g, four ridge portions 3i, and four ridge portions 3j. The ridge portions 3g are located between the end surfaces 3e and the main surfaces 3a. The ridge portions 3i are located between the end surfaces 3e and the side surfaces 3c. The ridge portions 3j are located between the main surfaces 3a and the side surfaces 3c. For example, the ridge portions 3g, 3i, and 3j are rounded to be curved. For example, the element body 3 is subjected to what is called a round chamfering process. The end surfaces 3e and the main surfaces 3a are indirectly adjacent to each other with the ridge portion 3g interposed therebetween. The end surfaces 3e and the side surfaces 3c are indirectly adjacent to each other with the ridge portion 3i interposed therebetween. The main surfaces 3a and the side surfaces 3c are indirectly adjacent to each other with the ridge portion 3j interposed therebetween.

The element body 3 is configured through laminating a plurality of dielectric layers in the second direction D2. The element body 3 includes a plurality of laminated dielectric layers. In the element body 3, a lamination direction of the plurality of dielectric layers coincides with the second direction D2. Each dielectric layer includes, for example, a sintered body of a ceramic green sheet containing a dielectric material. Examples of the dielectric material include dielectric ceramics. Examples of the dielectric ceramics include $BaTiO_3$-based, $Ba(Ti, Zr)O_3$-based, or $(Ba, Ca)TiO_3$-based dielectric ceramics. In the actual element body 3, each of the dielectric layers is integrated to such an extent that a boundary between the dielectric layers cannot be visually recognized.

The length of the element body 3 in the second direction D2 is a height of the element body 3. The length of the element body 3 in the third direction D3 is a width of the element body 3. The length of the element body 3 in the first direction D1 is a length of the element body 3. For example, the height of the element body 3 is 0.1 to 2.5 mm, the width of the element body 3 is 0.1 to 5.0 mm, and the length of the element body 3 is 0.2 to 5.7 mm. For example, the height of the element body 3 is 2.5 mm, the width of the element body 3 is 2.5 mm, and the length of the element body 3 is 3.2 mm.

Figure 2:
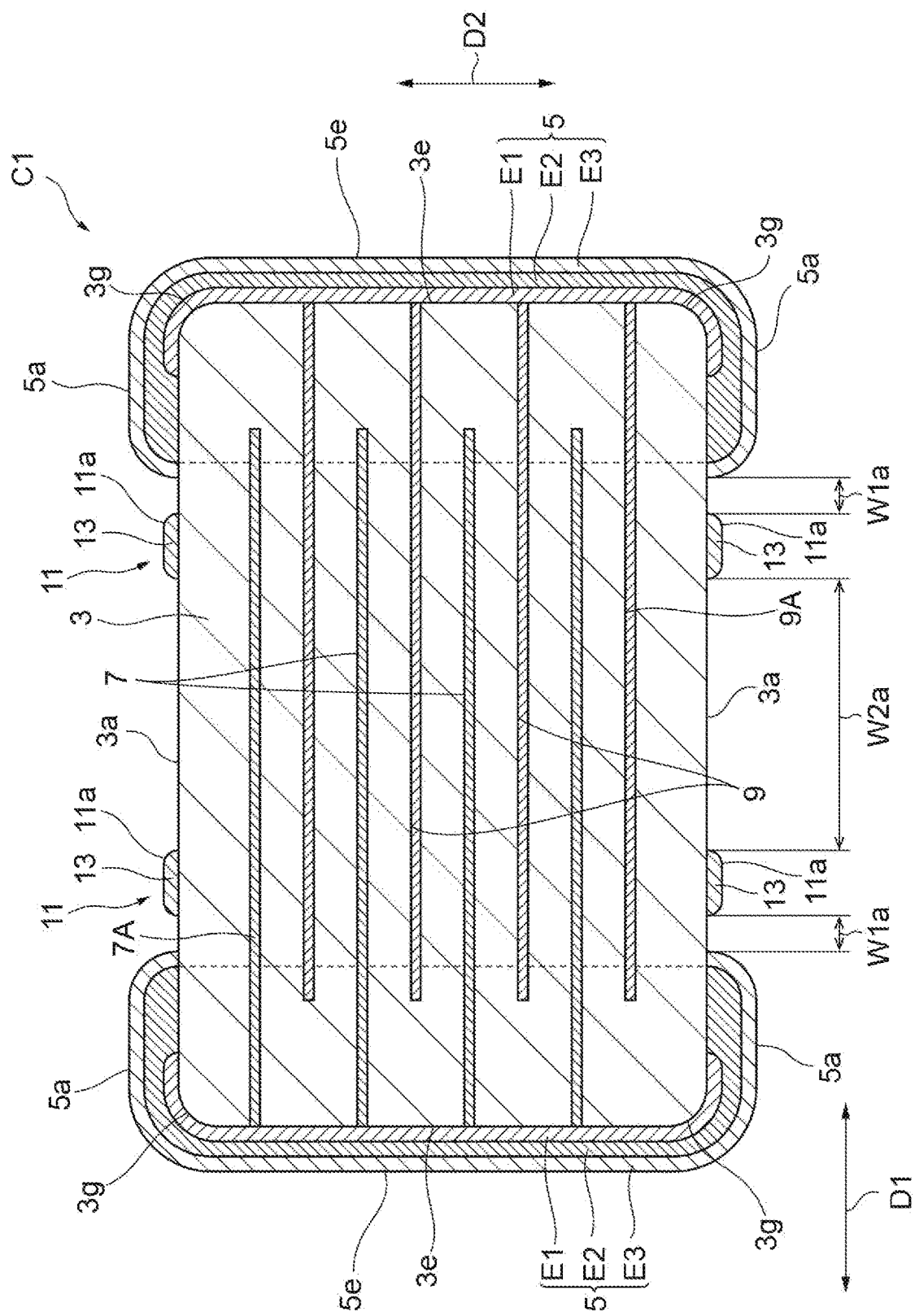
FIG. 2 is a view illustrating a cross-sectional configuration of the multilayer capacitor according to the first example.
Figure 3:
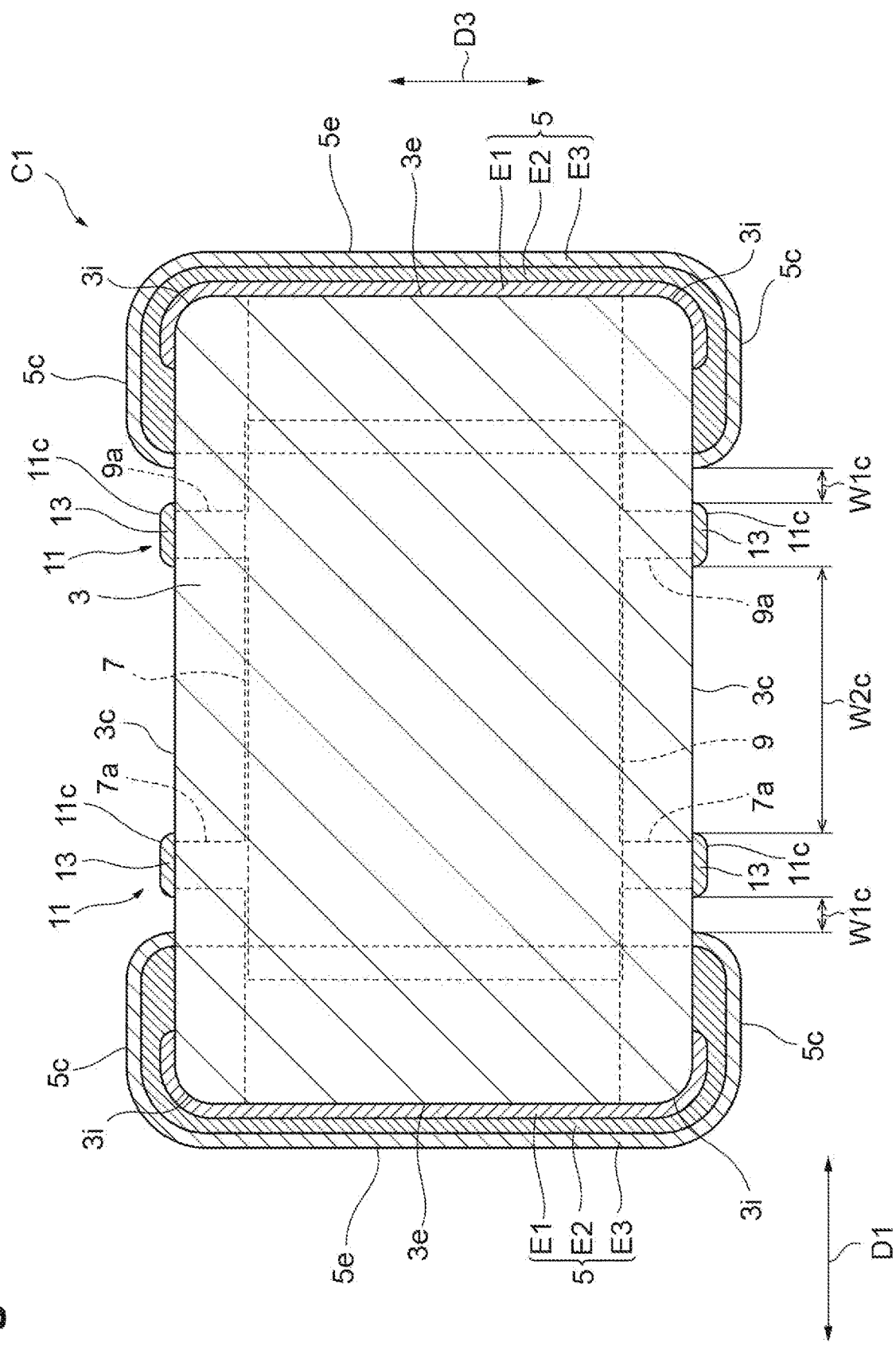
FIG. 3 is a view illustrating a cross-sectional configuration of the multilayer capacitor according to the first example.
Figure 4:
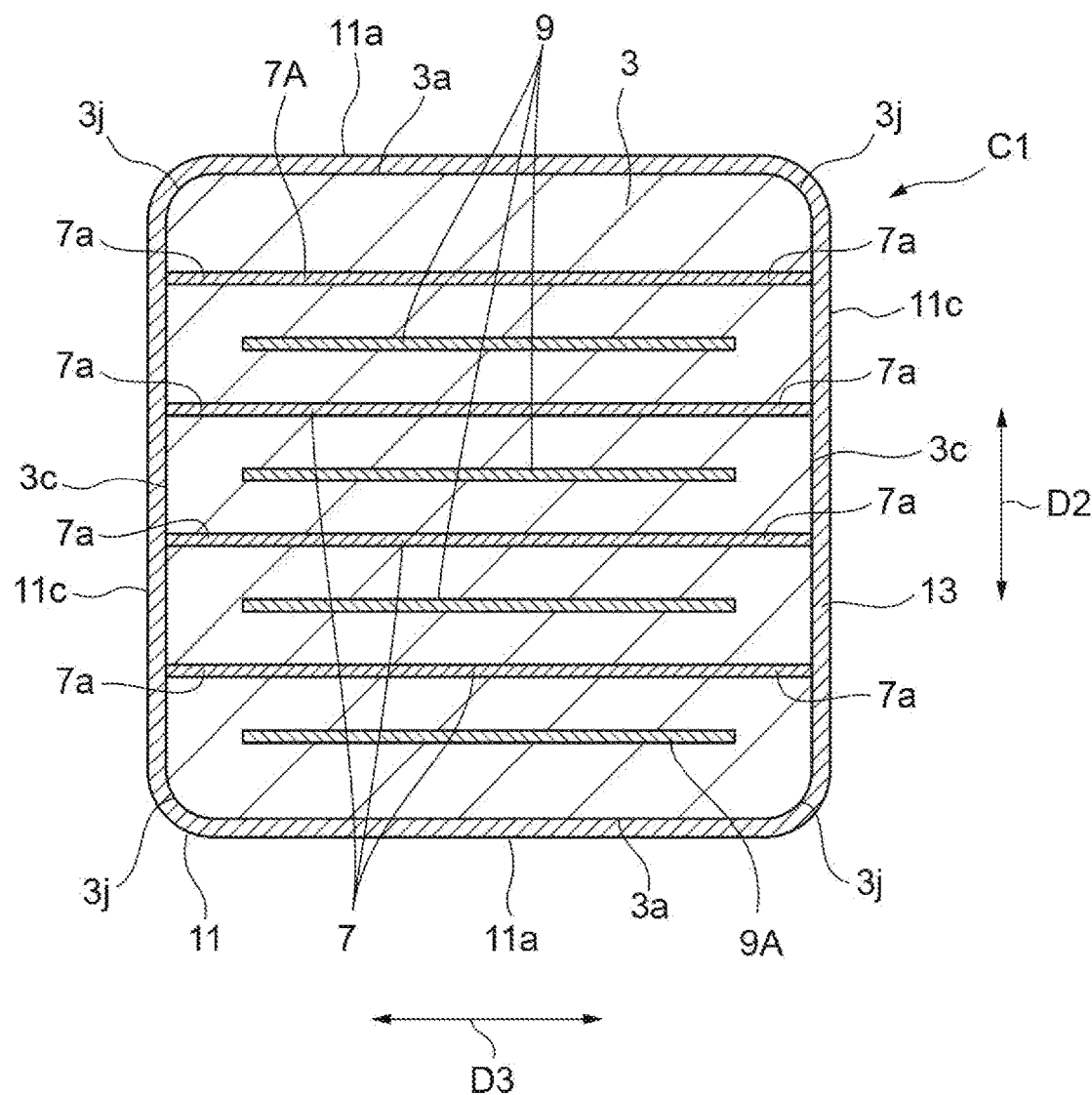
FIG. 4 is a view illustrating a cross-sectional configuration of the multilayer capacitor according to the first example.
Figure 5:
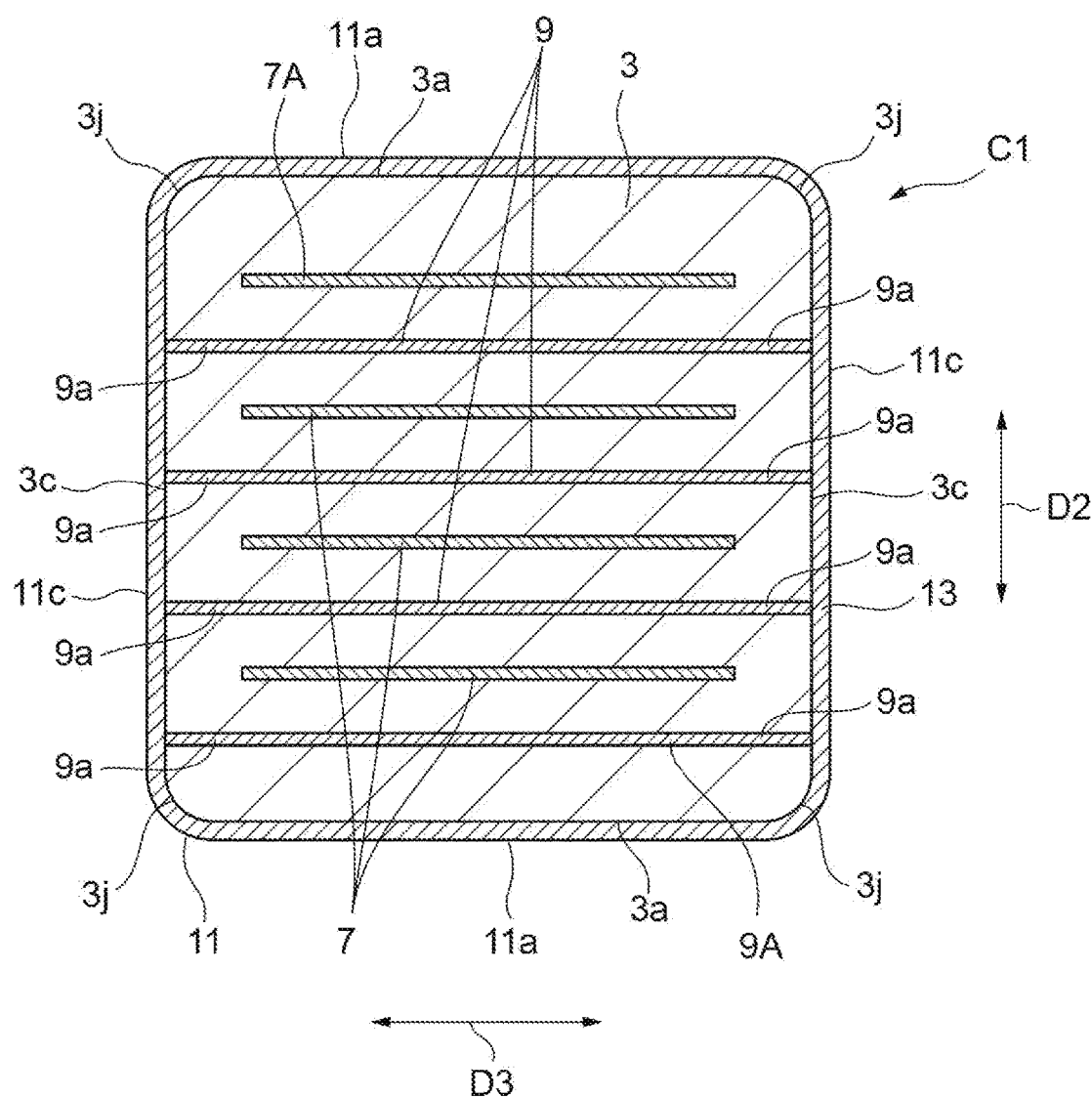
FIG. 5 is a view illustrating a cross-sectional configuration of the multilayer capacitor according to the first example.

As illustrated in FIG. 1, the external electrodes 5 are disposed at both ends of the element body 3 in the first direction D1. Each external electrode 5 is disposed on a corresponding end surface 3e of the pair of end surfaces 3e. For example, each external electrode 5 is disposed on the pair of main surfaces 3a, the pair of side surfaces 3c, and the end surface 3e. The external electrode 5 includes a plurality of electrode portions 5a, 5c, and 5e, as illustrated in FIGS. 2 to 4. The electrode portion 5a is disposed on the main surface 3a. The electrode portion 5a may be disposed on the ridge portion 3g. The electrode portion 5c is disposed on the side surface 3c. The electrode portion 5c may be disposed on the ridge portion 3i. The electrode portion 5e is disposed on the end surface 3e. The external electrode 5 also includes an electrode portion disposed on the ridge portion 3j.

Each external electrode 5 is formed on five surfaces of the pair of main surfaces 3a, the pair of side surfaces 3c, and the end surface 3e as well as the ridge portions 3g, 3i, and 3j. The electrode portions 5a, 5b, 5c, and 5e adjacent to each other are coupled and are electrically connected to each other. As illustrated in FIGS. 2 and 3, the external electrode 5 includes a first electrode layer E1, a second electrode layer E2, and a third electrode layer E3. The third electrode layer E3 is arranged to include the outermost layer of the external electrode 5. Each of the electrode portions 5a, 5c, and 5e includes the first electrode layer E1, the second electrode layer E2, and the third electrode layer E3.

The first electrode layer E1 of the electrode portion 5a is disposed on the main surface 3a and on the ridge portion 3g. The first electrode layer E1 of the electrode portion 5a covers a part of the main surface 3a and the entire ridge portion 3g. The first electrode layer E1 of the electrode portion 5a is in contact with the above-described part of the main surface 3a and the entire ridge portion 3g. In the electrode portion 5a, the first electrode layer E1 is in direct contact with the element body 3. The above-described part of the main surface 3a includes a partial region, of the main surface 3a, closer to the end surface 3e. The first electrode layer E1 of the electrode portion 5a is located on the main surface 3a. The first electrode layer E1 may not be formed on the main surface 3a. The first electrode layer E1 may not be disposed on the main surface 3a.

The second electrode layer E2 of the electrode portion 5a is disposed on the first electrode layer E1 and on the main surface 3a. In the electrode portion 5a, the second electrode layer E2 covers the first electrode layer E1 and a part of the main surface 3a. In the electrode portion 5a, the second electrode layer E2 is in direct contact with the first electrode layer E1 and the main surface 3a. The second electrode layer E2 of the electrode portion 5a includes a portion directly covering the first electrode layer E1 and a portion directly covering the main surface 3a. In the electrode portion 5a, the portion included in the second electrode layer E2 and directly covering the first electrode layer E1 indirectly covers the main surface 3a. The second electrode layer E2 of the electrode portion 5a is located on the main surface 3a. The main surface 3a includes a region covered with the second electrode layer E2 and a region exposed from the second electrode layer E2.

The third electrode layer E3 of the electrode portion 5a is disposed on the second electrode layer E2. In the electrode portion 5a, the third electrode layer E3 covers the second electrode layer E2. In the electrode portion 5a, the third electrode layer E3 is in contact with the entire second electrode layer E2. In the electrode portion 5a, the third electrode layer E3 is in direct contact with the second electrode layer E2. In the electrode portion 5a, the third electrode layer E3 is not in direct contact with the first electrode layer E1. The third electrode layer E3 of the electrode portion 5a is located on the main surface 3a.

The first electrode layer E1 of the electrode portion 5c is disposed on the side surface 3c and on the ridge portion 3i. The first electrode layer E1 of the electrode portion 5c covers a part of the side surface 3c and the entire ridge portion 3i. The first electrode layer E1 of the electrode portion 5c is in contact with the above-described part of the side surface 3c and on the entire ridge portion 3i. In the electrode portion 5c, the first electrode layer E1 is in direct contact with the element body 3. The above-described part of the side surface 3c includes a partial region, of the side surface 3c, closer to the end surface 3e. The first electrode layer E1 of the electrode portion 5c is located on the side surface 3c. The first electrode layer E1 may not be formed on the side surface 3c. The first electrode layer E1 may not be disposed on the side surface 3c.

The second electrode layer E2 of the electrode portion 5c is disposed on the first electrode layer E1 and on the side surface 3c. In the electrode portion 5c, the second electrode layer E2 covers the first electrode layer E1 and a part of the side surface 3c. In the electrode portion 5c, the second electrode layer E2 is in direct contact with the first electrode layer E1 and the side surface 3c. The second electrode layer E2 of the electrode portion 5c includes a portion directly covering the first electrode layer E1 and a portion directly covering the side surface 3c. In the electrode portion 5c, the portion included in the second electrode layer E2 and directly covering the first electrode layer E1 indirectly covers the side surface 3c. The second electrode layer E2 of the electrode portion 5c is located on the side surface 3c. The side surface 3c includes a region covered with the second electrode layer E2 and a region exposed from the second electrode layer E2.

The third electrode layer E3 of the electrode portion 5c is disposed on the second electrode layer E2. In the electrode portion 5c, the third electrode layer E3 covers the second electrode layer E2. In the electrode portion 5c, the third electrode layer E3 is in contact with the entire second electrode layer E2. In the electrode portion 5c, the third electrode layer E3 is in direct contact with the second electrode layer E2. The third electrode layer E3 of the electrode portion 5c is located on the side surface 3c.

The first electrode layer E1 of the electrode portion 5e is disposed on the end surface 3e. The first electrode layer E1 of the electrode portion 5e covers the entire end surface 3e. The first electrode layer E1 of the electrode portion 5e is in contact with the entire end surface 3e. In the electrode portion 5e, the first electrode layer E1 is in direct contact with the end surface 3e.

The second electrode layer E2 of the electrode portion 5e is disposed on the first electrode layer E1. In the electrode portion 5e, the second electrode layer E2 covers the entire first electrode layer E1. In the electrode portion 5e, the second electrode layer E2 is in direct contact with the first electrode layer E1. The second electrode layer E2 of the electrode portion 5e directly covers the first electrode layer E1 and indirectly covers the end surface 3e. The second electrode layer E2 of the electrode portion 5e is located on the end surface 3e.

The third electrode layer E3 of the electrode portion 5e is disposed on the second electrode layer E2. In the electrode portion 5e, the third electrode layer E3 covers the entire second electrode layer E2. In the electrode portion 5e, the third electrode layer E3 is in contact with the entire second electrode layer E2. In the electrode portion 5e, the third electrode layer E3 is in direct contact with the second electrode layer E2. The third electrode layer E3 of the electrode portion 5e is located on the end surface 3e.

The first electrode layer E1 is formed from sintering electrically conductive paste applied onto the surface of the element body 3. The first electrode layer E1 covers the above-described part of each of the main surfaces 3a, the above-described part of each of the side surfaces 3c, the end surface 3e, and the ridge portions 3g, 3i, and 3j. The first electrode layer E1 is formed from sintering a metal component (metal particles) included in the electrically conductive paste. The metal component contained in the electrically conductive paste includes, for example, metal particles. The first electrode layer E1 includes a sintered metal layer. The first electrode layer E1 includes the sintered metal layer formed on the element body 3. For example, the first electrode layer E1 includes a sintered metal layer made of Cu. The first electrode layer E1 may include a sintered metal layer made of Ni. The first electrode layer E1 includes a base metal. The electrically conductive paste includes, for example, particles made of Cu or Ni, a glass component, an organic binder, and an organic solvent. The first electrode layer E1 included in each of the electrode portions 5a, 5c, and 5e is integrally formed.

The second electrode layer E2 is formed from curing electrically conductive resin paste applied onto the first electrode layer E1. The second electrode layer E2 is formed over the first electrode layer E1 and the element body 3. The first electrode layer E1 includes an underlying metal layer for forming the second electrode layer E2. The second electrode layer E2 includes an electrically conductive resin layer that covers the first electrode layer E1. The conductive resin paste includes, for example, a resin, an electrically conductive material, and an organic solvent. The resin includes, for example, a thermosetting resin. The conductive material includes, for example, metal particles. The metal particles include, for example, silver particles. For example, the second electrode layer E2 includes a plurality of silver particles. The thermosetting resin is, for example, a phenol resin, an acrylic resin, a silicone resin, an epoxy resin, or a polyimide resin. The second electrode layer E2 is in contact with a part of the ridge portion 3$j$. The second electrode layer E2 included in each of the electrode portions 5$a$, 5$c$, and 5$e$ is integrally formed.

The third electrode layer E3 is formed on the second electrode layer E2 through a plating method. The third electrode layer E3 may have a multilayer structure. In this case, the third electrode layer E3 includes, for example, an Ni plating layer and a solder plating layer. The Ni plating layer is formed on the second electrode layer E2. The solder plating layer is formed on the Ni plating layer. The solder plating layer covers the Ni plating layer. The Ni plating layer has better solder leach resistance than the metal included in the second electrode layer E2. The third electrode layer E3 may include an Sn plating layer, a Cu plating layer, or an Au plating layer instead of the Ni plating layer. The solder plating layer includes, for example, an Sn plating layer, an Sn—Ag alloy plating layer, an Sn—Bi alloy plating layer, or an Sn—Cu alloy plating layer. The third electrode layer E3 included in each of the electrode portions 5$a$, 5$c$, and 5$e$ is integrally formed.

As illustrated in FIGS. 1 to 5, the multilayer capacitor C1 includes a pair of external conductors 11. The pair of external conductors 11 are disposed on the outer surface of the element body 3. The pair of external conductors 11 are disposed in the first direction D1, on the side surface. The pair of external conductors 11 are disposed in the first direction D1, on the pair of main surfaces 3$a$ and the pair of side surfaces 3$c$. The pair of external conductors 11 are separated from each other in the first direction D1. The external conductors 11 are separated from the external electrodes 5. The pair of external conductors 11 are disposed between the pair of external electrodes 5 in the first direction D1.

The external conductors 11 are disposed over the pair of main surfaces 3$a$ and the pair of side surfaces 3$c$. Each external conductor 11 includes portions 11$a$ each disposed on a corresponding main surface 3$a$ of the pair of main surfaces 3$a$, and portions 11$c$ each disposed on a corresponding side surface 3$c$ of the pair of side surfaces 3$c$. Each external conductor 11 includes the pair of portions 11$a$ and the pair of portions 11$c$. For example, the portions 11$a$ and the portions 11$c$ are integrally formed. Each external conductor 11 is also disposed on each ridge portion 3$j$. The portions 11$a$ and the portions 11$c$ are not only physically connected to each other but also electrically connected to each other.

One external conductor 11 of the pair of external conductors 11 and One external electrode 5 of the pair of external electrodes 5 are adjacent to each other in the first direction D1. The one external conductor 11 and the electrode portions 5$a$ and 5$c$ of the one external electrode 5 are adjacent to each other in the first direction D1. Another external conductor 11 of the pair of external conductors 11 and another external electrode 5 of the pair of external electrodes 5 are adjacent to each other in the first direction D1. The other external conductor 11 and the electrode portions 5$a$ and 5$c$ of the other external electrode 5 are adjacent to each other in the first direction D1. The one external conductor 11 is located between the one external electrode 5 and the other external conductor 11. The other external conductor 11 is located between the other external electrode 5 and the one external conductor 11.

The portions 11$a$ are disposed between the electrode portions 5$a$ located on the same main surface 3$a$ on which the portions 11$a$ are disposed, and are separated from the electrode portions 5$a$. The portion 11$a$ extends along an end edge of the electrode portion 5$a$. The portion 11$a$ extends in the third direction D3.

A distance W1$a$ between the electrode portion 5$a$ and the portion 11$a$ adjacent to each other in the first direction D1 is smaller than a distance W2$a$ between the pair of portions 11$a$ adjacent to each other in the first direction D1. The distance W1$a$ is a shortest distance between the electrode portion 5$a$ and the portion 11$a$ in the first direction D1. The distance W2$a$ is a shortest distance between the pair of portions 11$a$ in the first direction D1. The distance W1$a$ between the portion 11$a$ included in the one external conductor 11 and the electrode portion 5$a$ included in the one external electrode 5 may be equal to or different from the distance W1$a$ between the portion 11$a$ included in the other external conductor 11 and the electrode portion 5$a$ included in the other external electrode 5. For example, when the distance W1$a$ between the portion 11$a$ included in the one external conductor 11 and the electrode portion 5$a$ included in the one external electrode 5 includes a first shortest distance, the distance W1$a$ between the portion 11$a$ included in the other external conductor 11 and the electrode portion 5$a$ included in the other external electrode 5 includes a second shortest distance.

The portions 11$c$ are disposed between the electrode portions 5$c$ located on the same side surface 3$c$ on which the portions 11$c$ are disposed, and are separated from the electrode portions 5$c$. The portion 11$c$ extends along an end edge of the electrode portion 5$c$. The portion 11$c$ extends in the second direction D2.

A distance W1$c$ between the electrode portion 5$c$ and the portion 11$c$ adjacent to each other in the first direction D1 is smaller than a distance W2$c$ between the pair of portions 11$c$ adjacent to each other in the first direction D1. The distance W1$c$ is a shortest distance between the electrode portion 5$c$ and the portion 11$c$ in the first direction D1. The distance W2$c$ is a shortest distance between the pair of portions 11$c$ in the first direction D1. The distance W1$c$ between the portion 11$c$ included in the one external conductor 11 and the electrode portion 5$c$ included in the one external electrode 5 may be equal to or different from the distance W1$c$ between the portion 11$c$ included in the other external conductor 11 and the electrode portion 5$c$ included in the other external electrode 5. For example, when the distance W1$c$ between the portion 11$c$ included in the one external conductor 11 and the electrode portion 5$c$ included in the one external electrode 5 includes a first shortest distance, the distance W1$a$ between the portion 11$c$ included in the other external conductor 11 and the electrode portion 5$c$ included in the other external electrode 5 includes a second shortest distance.

The distance W1$a$ and the distance W1$c$ may be equal to or different from each other. The distance W2$a$ and the distance W2$c$ may be equal to or different from each other.

The external conductor 11 includes a conductor layer 13. The conductor layer 13 includes the pair of portions 11$a$ and the pair of portions 11$c$. The conductor layer 13 includes, for example, a sintered metal layer. In this case, the conductor layer 13 includes a metal layer. The conductor layer 13 including the sintered metal layer is formed from sintering electrically conductive paste applied onto the surface of the element body 3. The conductor layer 13 includes a sintered metal layer formed on the element body 3. For example, the conductor layer 13 includes a sintered metal layer made of Cu. The electrically conductive paste includes, for example, particles made of Cu, a glass component, an organic binder, and an organic solvent. The conductor layer 13 may include a sintered metal layer made of Ni.

For example, Cu and N are electrically conductive materials in which migration is less prone to occur than in silver (silver particles included in the second electrode layer E2). Generally, migration is relatively prone to occur in silver. The external electrode 5 includes the second electrode layer E2 in which migration is relatively prone to occur. The external conductor 11 includes the conductor layer 13 in which migration is less prone to occur than in the second electrode layer E2. The conductor layer 13 does not substantially include silver.

A plating layer may be formed on the surface of the external conductor 11. The plating layer may have, for example, the same configuration as that of the third electrode layer E3.

The conductor layer 13 may include a conductive resin layer. In a configuration in which the conductor layer 13 includes a conductive resin layer, the conductor layer 13 may be formed from curing electrically conductive resin paste applied onto the element body 3. This conductive resin paste includes, for example, a resin, a plurality of electrically conductive particles, and an organic solvent. This resin includes, for example, a thermosetting resin. The electrically conductive particles include, for example, metal particles. The metal particles include, for example, copper particles. In a configuration in which the conductor layer 13 includes a conductive resin layer, the conductor layer 13 may include a plurality of copper particles. The thermosetting resin is, for example, a phenol resin, an acrylic resin, a silicone resin, an epoxy resin, or a polyimide resin. The electrically conductive particles included in the conductive resin layer included in the conductor layer 13 may include carbon particles. Even in a configuration in which the conductor layer 13 includes a conductive resin layer, the external conductor 11 includes the conductor layer 13 in which migration is less prone to occur than in the second electrode layer E2. Even in a configuration in which the conductor layer 13 includes a conductive resin layer, the conductor layer 13 does not substantially include silver.

As illustrated in FIGS. 2 to 5, the multilayer capacitor C1 includes a plurality of internal electrodes 7 and a plurality of internal electrodes 9. Each of the internal electrodes 7 and 9 includes an internal conductor disposed in the element body 3. A plurality of internal conductors included in the multilayer capacitor C1 include the plurality of internal electrodes 7 and the plurality of internal electrodes 9. For example, when the internal electrode 7 includes a first internal conductor, the internal electrode 9 includes a second internal conductor. In FIG. 3, for the sake of explanation, the internal electrodes 7 and 9 are intentionally illustrated so as to deviate from each other in the third direction D3.

Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. For example, the internal electrodes 7 and 9 are made of Ni.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween. The plurality of internal electrodes 7 and the plurality of internal electrodes 9 are alternately disposed in the second direction D2. The plurality of internal electrodes 7 and the plurality of internal electrodes 9 are disposed in the element body 3 to be distributed in the second direction D2. Each of the plurality of internal electrodes 7 and the plurality of internal electrodes 9 is located in a plane substantially parallel to the main surfaces 3a. Each of the plurality of internal electrodes 7 and the plurality of internal electrodes 9 is disposed to extend in a direction intersecting the side surfaces 3c. For example, each of the plurality of internal electrodes 7 and the plurality of internal electrodes 9 is disposed to extend in a direction substantially orthogonal to the side surfaces 3c. The internal electrode 7 and the internal electrode 9 oppose each other in the second direction D2. The direction in which the internal electrode 7 and the internal electrode 9 oppose each other, that is, the second direction D2 is orthogonal to a direction parallel to the main surfaces 3a (third direction D3 and first direction D1).

The internal electrodes 7 and the internal electrodes 9 have different polarities from each other. One end of each of the internal electrodes 7 and 9 is exposed to a corresponding end surface 3e of the pair of end surfaces 3e. Each of the internal electrodes 7 and 9 includes the one end exposed to the corresponding end surface 3e. One electrode portion 5e entirely covers the one ends of the plurality of internal electrodes 7. Another electrode portion 5e entirely covers the one ends of the plurality of internal electrodes 9. Each electrode portion 5e is directly connected to corresponding internal electrodes of the plurality of internal electrodes 7 and 9. Each external electrode 5 is electrically connected to the corresponding internal electrodes of the plurality of internal electrodes 7 and 9. For example, the plurality of internal electrodes 7 are physically and electrically connected to one external electrode 5 of the pair of external electrodes 5. The plurality of internal electrodes 9 are physically and electrically connected to another external electrode 5 of the pair of external electrodes 5.

Each of the internal electrodes 7 and 9 is connected to a corresponding external conductor 11 of the pair of external conductors 11. The internal electrodes 7 are electrically connected to the one external conductor 11 adjacent to the one external electrode 5, in the first direction D1, to which the internal electrodes 7 are physically and electrically connected. The second electrode layer E2 included in the one external electrode 5 and the one external conductor 11 are electrically connected through the internal electrodes 7. The internal electrodes 9 are electrically connected to the other external conductor 11 adjacent to the other external electrode 5, in the first direction D1, to which the internal electrodes 9 are physically and electrically connected. The second electrode layer E2 included in the other external electrode 5 is electrically connected to the other external conductor 11 through the internal electrodes 9.

The internal electrode 7 includes a pair of connection portions 7a. Each of the pair of connection portions 7a is exposed to a corresponding side surface 3c of the pair of side surfaces 3c. Each of the pair of connection portions 7a includes an end exposed to the corresponding side surface 3c. Each connection portion 7a is physically and electrically connected to the portion 11c disposed on the corresponding side surface 3c at the end exposed to the corresponding side surface 3c. The internal electrode 7 is physically connected to the corresponding external conductor 11 at a plurality of portions of the internal electrode 7. For example, all internal electrodes 7 are physically connected to the corresponding external conductor 11. However, it is not necessary for all internal electrodes 7 to be physically connected to the corresponding external conductor 11. At least one of the plurality of internal electrodes 7 may be physically connected to the corresponding external conductor 11.

The internal electrode 9 includes a pair of connection portions 9a. Each of the pair of connection portions 9a is exposed to a corresponding side surface 3c of the pair of side surfaces 3c. Each of the pair of connection portions 9a includes an end exposed to the corresponding side surface 3c. Each connection portion 9a is physically and electrically connected to the portion 11c disposed on the corresponding side surface 3c at the end exposed to the corresponding side surface 3c. The internal electrode 9 is physically connected to the corresponding external conductor 11 at a plurality of portions of the internal electrode 9. For example, all internal electrodes 9 are physically connected to the corresponding external conductor 11. However, it is not necessary for all internal electrodes 9 to be physically connected to the corresponding external conductor 11. At least one of the plurality of internal electrodes 9 may be physically connected to the corresponding external conductor 11. The connection portion 7a and the connection portion 9a exposed to the same side surface 3c are separated from each other in the first direction D1.

The plurality of internal electrodes 7 include an internal electrode 7A adjacent to the other main surface 3a. The internal electrode 7A opposes the second electrode layer E2 included in the electrode portion 5a that is electrically connected to the internal electrode 9 and located on the other main surface 3a, for example, in the second direction D2. When the internal electrode 7A and the second electrode layer E2 that is electrically connected to the internal electrode 9 and located on the other main surface 3a are viewed from, for example, the second direction D2, the internal electrode 7A and the second electrode layer E2 that is electrically connected to the internal electrode 9 and located on the other main surface 3a overlap each other. Therefore, an electric field tends to be generated between the internal electrode 7A and the second electrode layer E2 that is electrically connected to the internal electrode 9 and located on the other main surface 3a.

The plurality of internal electrodes 9 include an internal electrode 9A adjacent to the one main surface 3a. The internal electrode 9A opposes the second electrode layer E2 included in the electrode portion 5a that is electrically connected to the internal electrode 7 and located on the one main surface 3a, for example, in the second direction D2. When the internal electrode 9A and the second electrode layer E2 that is electrically connected to the internal electrode 7 and located on the one main surface 3a are viewed from, for example, the second direction D2, the internal electrode 9A and the second electrode layer E2 that is electrically connected to the internal electrode 7 and located on the one main surface 3a overlap each other. Therefore, an electric field tends to be generated between the internal electrode 9A and the second electrode layer E2 that is electrically connected to the internal electrode 7 and located on the one main surface 3a.

The plurality of internal electrodes 7 oppose the second electrode layer E2 included in the electrode portion 5c that is electrically connected to the internal electrode 9 and located on each side surface 3c, for example, in the third direction D3. When the plurality of internal electrodes 7 and the second electrode layer E2 that is electrically connected to the internal electrode 9 and located on each side surface 3c are viewed from, for example, the third direction D3, the plurality of internal electrodes 7 and the second electrode layer E2 that is electrically connected to the internal electrode 9 and located on each side surface 3c overlap each other. Therefore, an electric field tends to be generated between the plurality of internal electrodes 7 and the second electrode layer E2 that is electrically connected to the internal electrode 9 and located on each side surface 3c.

The plurality of internal electrodes 9 oppose the second electrode layer E2 included in the electrode portion 5c that is electrically connected to the internal electrode 7 and located on each side surface 3c, for example, in the third direction D3. When the plurality of internal electrodes 9 and the second electrode layer E2 that is electrically connected to the internal electrode 7 and located on each side surface 3c are viewed from, for example, the third direction D3, the plurality of internal electrodes 9 and the second electrode layer E2 that is electrically connected to the internal electrode 7 and located on each side surface 3c overlap each other. Therefore, an electric field tends to be generated between the plurality of internal electrodes 9 and the second electrode layer E2 that is electrically connected to the internal electrode 7 and located on each side surface 3c.

The plurality of internal electrodes 7 oppose the external conductor 11 (conductor layer 13) that is electrically connected to the internal electrode 9, for example, in the third direction D3. Therefore, an electric field may be generated between the plurality of internal electrodes 7 and the external conductor 11 that is electrically connected to the internal electrode 9.

The plurality of internal electrodes 9 oppose the external conductor 11 (conductor layer 13) that is electrically connected to the internal electrode 7, for example, in the third direction D3. Therefore, an electric field may be generated between the plurality of internal electrodes 9 and the external conductor 11 that is electrically connected to the internal electrode 7.

In the multilayer capacitor C1, the second electrode layer E2 included in the external electrode 5 and the conductor layer 13 included in the external conductor 11 adjacent to the external electrode 5 in the first direction D1 are electrically connected to each other. When an electric field acts on the second electrode layer E2, the electric field acts not only on the second electrode layer E2 but also on the conductor layer 13 electrically connected to the second electrode layer E2. The electric field tends not to be concentrated on the second electrode layer 2, and the conductor layer 13 reduces the electric field acting on the second electrode layer E2. Therefore, even when an electric field acts on the second electrode layer E2, metal included in the second electrode layer E2 tends not to be ionized. Migration tends not to occur in the second electrode layer E2.

Migration is less prone to occur in the conductor layer 13 than in the second electrode layer E2. Therefore, even when an electric field acts on the conductor layer 13, the migration tends not to occur in the conductor layer 13.

The one external conductor 11 is located between the external electrode 5 (second electrode layer E2) electrically connected to the one external conductor 11 and the other external conductor 11. Therefore, even when migration occurs in the second electrode layer E2 included in the external electrode 5 electrically connected to the one external conductor 11, the one external conductor 11 prevents the migration from proceeding.

The other external conductor 11 is located between the external electrode 5 (second electrode layer E2) electrically connected to the other external conductor 11 and the one external conductor 11. Therefore, even when migration occurs in the second electrode layer E2 included in the external electrode 5 electrically connected to the other external conductor 11, the other external conductor 11 prevents the migration from proceeding.

Consequently, the multilayer capacitor C1 prevents the migration from proceeding.

In the multilayer capacitor C1, each external conductor 11 is disposed over the pair of main surfaces 3a and the pair of side surfaces 3c. Therefore, the multilayer capacitor C1 reliably prevents the migration from proceeding.

In the multilayer capacitor C1, each of the plurality of internal electrodes 7 is physically connected to the corresponding external conductor 11 at the plurality of portions of each internal electrode 7, and each of the plurality of internal electrodes 9 is physically connected to the corresponding external conductor 11 at the plurality of portions of each internal electrode 9. Therefore, the multilayer capacitor C1 reliably prevents the migration from proceeding.

In the multilayer capacitor C1, the distance W1a is smaller than the distance W2a, and the distance W1c is smaller than the distance W2c. Therefore, the multilayer capacitor C1 reduces a progress distance of the migration, even when the migration occurs in the second electrode layer E2. Consequently, the pair of external electrodes 5 tend not to be short-circuited.

In the multilayer capacitor C1, the second electrode layer E2 includes the plurality of silver particles, and the conductor layer 13 includes the metal layer in which migration is less prone to occur than in silver.

The multilayer capacitor C1 reliably prevents the migration from proceeding, even in a configuration in which the second electrode layer E2 includes the plurality of silver particles.

Figure 6:
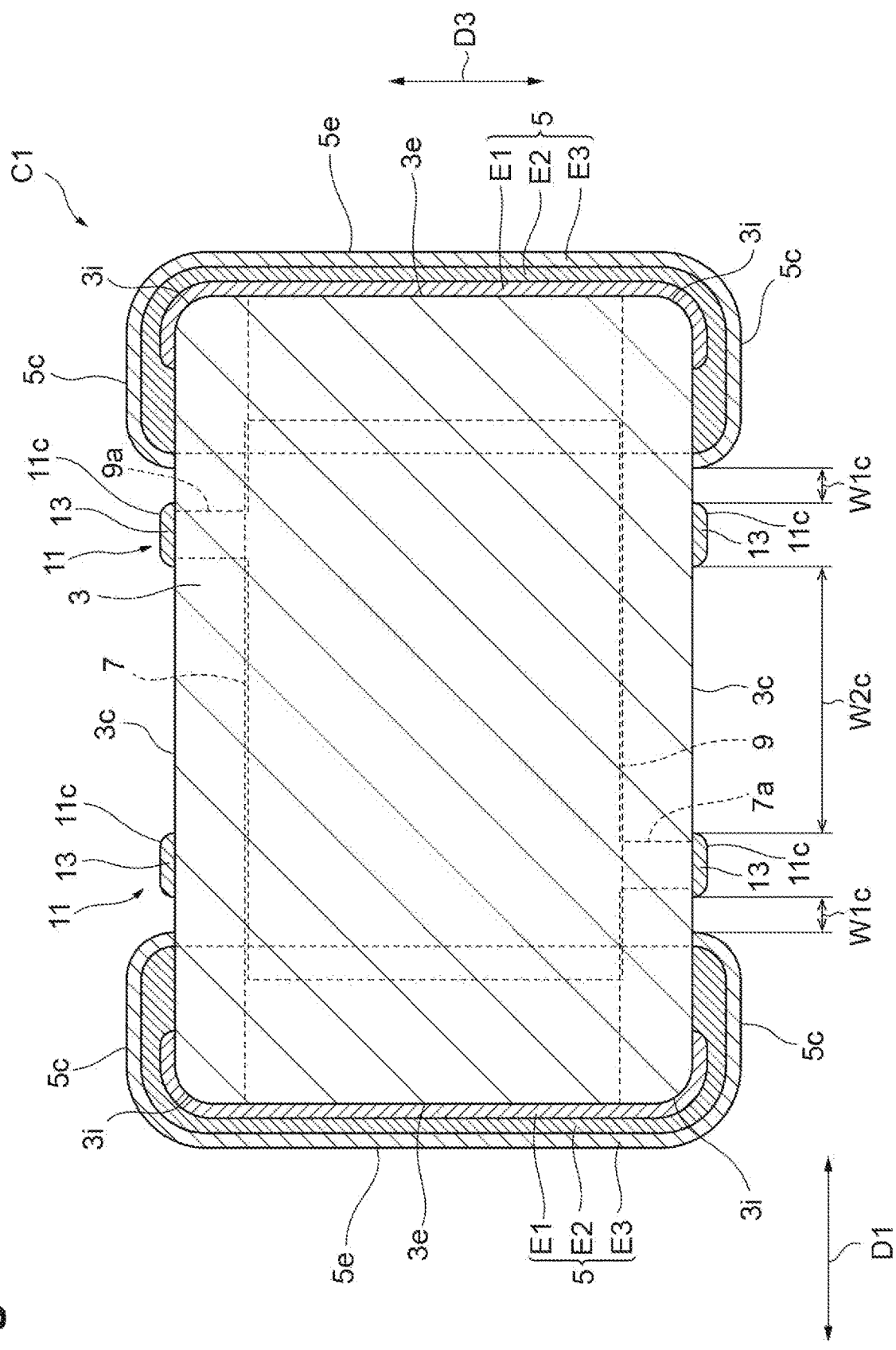
FIG. 6 is a view illustrating a cross-sectional configuration of a multilayer capacitor according to one modified example of the first example.
Figure 7:
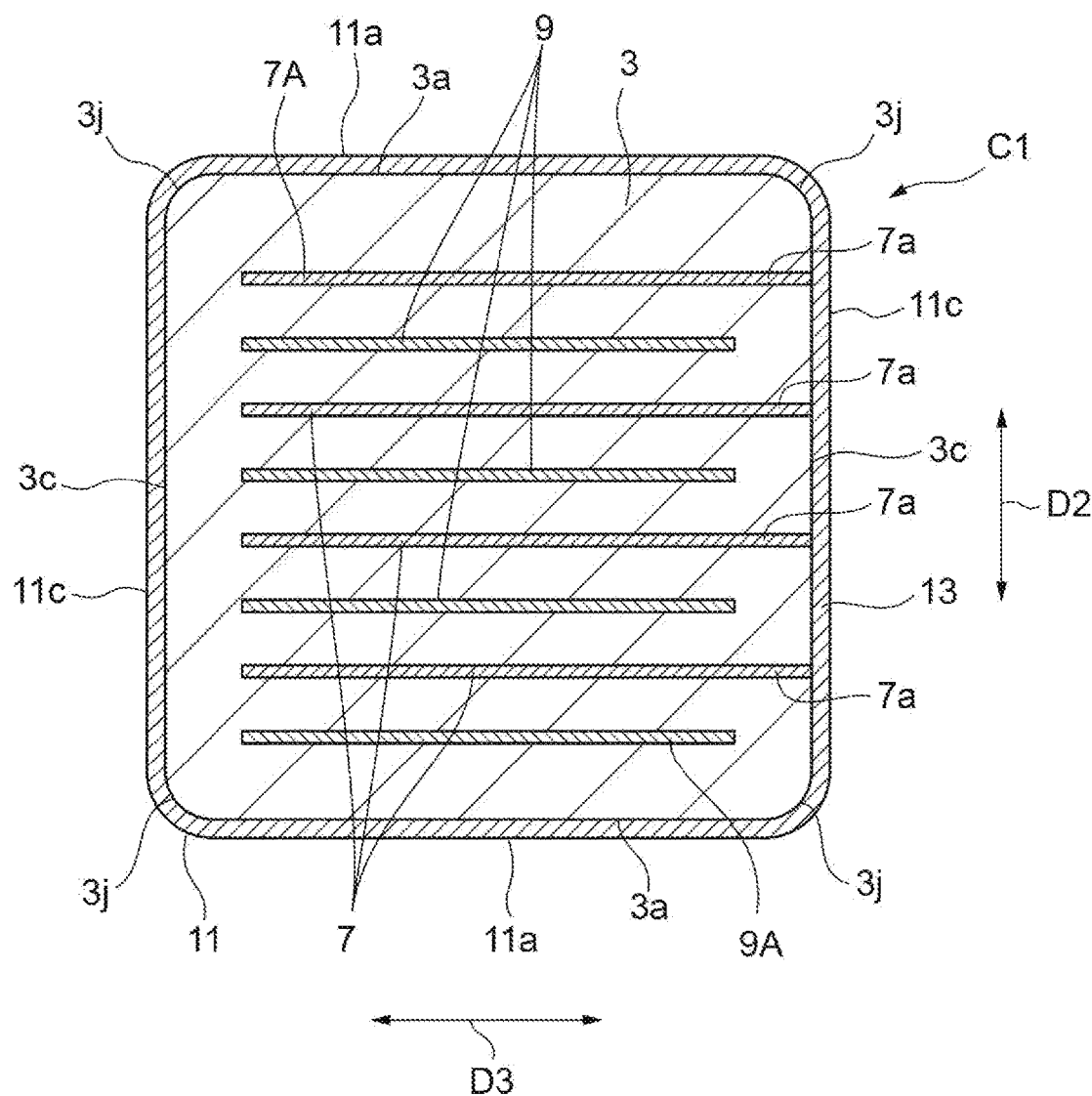
FIG. 7 is a view illustrating a cross-sectional configuration of the multilayer capacitor according to the one modified example of the first example.
Figure 8:
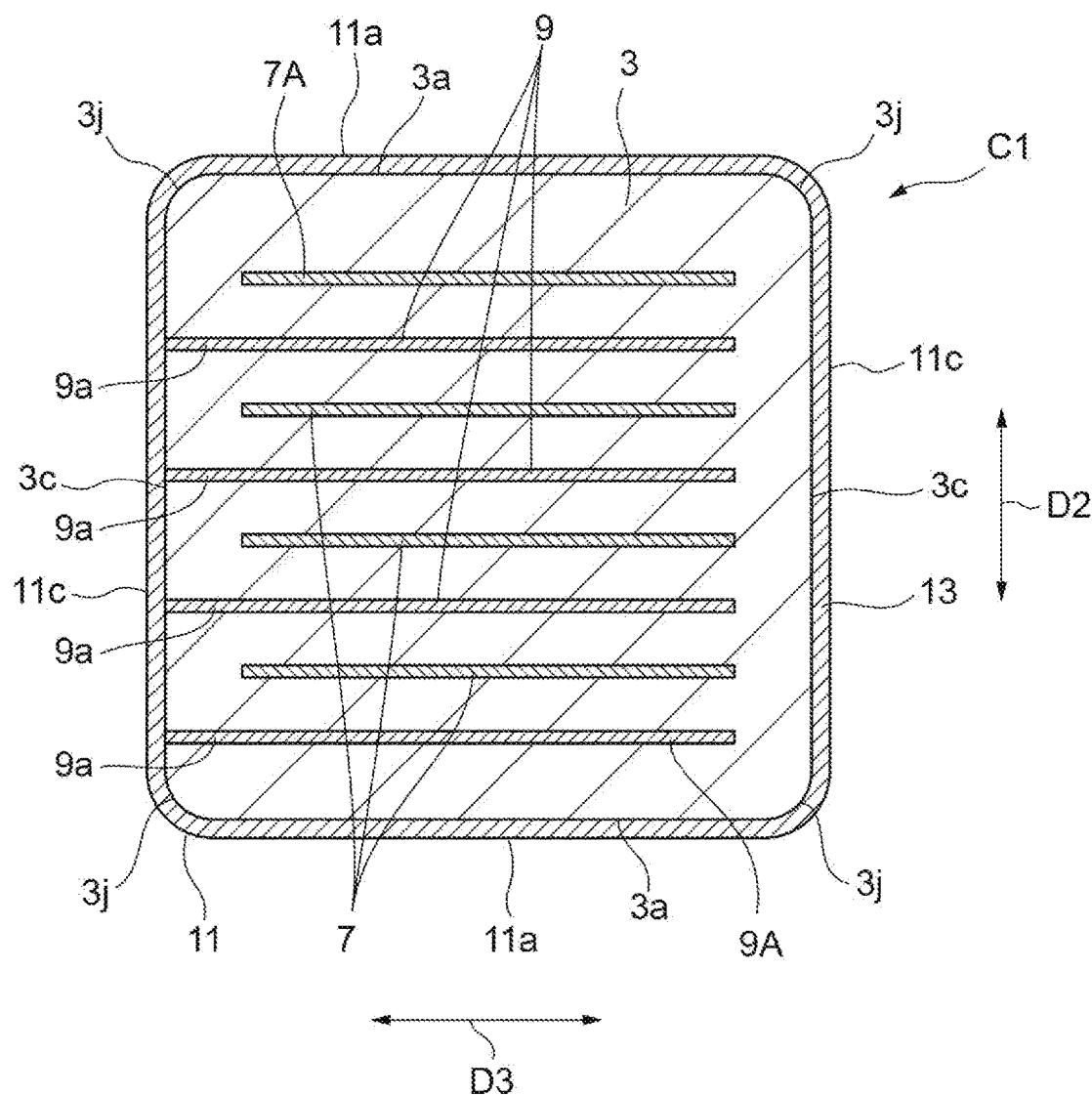
FIG. 8 is a view illustrating a cross-sectional configuration of the multilayer capacitor according to the one modified example of the first example.

Next, a configuration of a multilayer capacitor C1 according to one modified example of the first example will be described with reference to FIGS. 6 to 8. FIGS. 6, 7, and 8 are views illustrating a cross-sectional configuration of a multilayer capacitor according to the one modified example of the first example.

The multilayer capacitor C1 according to the one modified example is generally similar to or the same as the multilayer capacitor C1 according to the first example described above. However, the one modified example is different from the above-described first example in a configuration of the internal electrodes 7 and 9. Hereinafter, differences between the above-described first example and the one modified example will be mainly described. In FIG. 6, for the sake of explanation, the internal electrodes 7 and 9 are intentionally illustrated so as to deviate from each other in the third direction D3.

Each of the plurality of internal electrodes 7 includes one connection portion 7a. Each internal electrode 7 includes only one connection portion 7a. The connection portion 7a is exposed to one side surface 3c of the pair of side surfaces 3c. The connection portion 7a includes an end exposed to the one side surface 3c. The connection portion 7a is physically and electrically connected to the portion 11c disposed on the one side surface 3c, at the end exposed to the one side surface 3c. Also in the one modified example, at least one internal electrode 7 among the plurality of internal electrodes 7 may be physically connected to the corresponding external conductor 11.

Each of the plurality of internal electrodes 9 includes one connection portion 9a. Each internal electrode 9 includes only one connection portion 9a. The connection portion 9a is exposed to another side surface 3c of the pair of side surfaces 3c. The connection portion 9a includes an end exposed to the other side surface 3c. The connection portion 9a is physically and electrically connected to the portion 11c disposed on the other side surface 3c, at the end exposed to the other side surface 3c. Also in the one modified example, at least one internal electrode 9 among the plurality of internal electrodes 9 may be physically connected to the corresponding external conductor 11.

In the multilayer capacitor C1 according to the one modified example, the internal electrode 7 is physically connected to the portion 11c included in the corresponding external conductor 11 and located on the one side surface 3c. The internal electrode 9 is physically connected to the portion 11c included in the corresponding external conductor 11 and located on the other side surface 3c.

Figure 9:
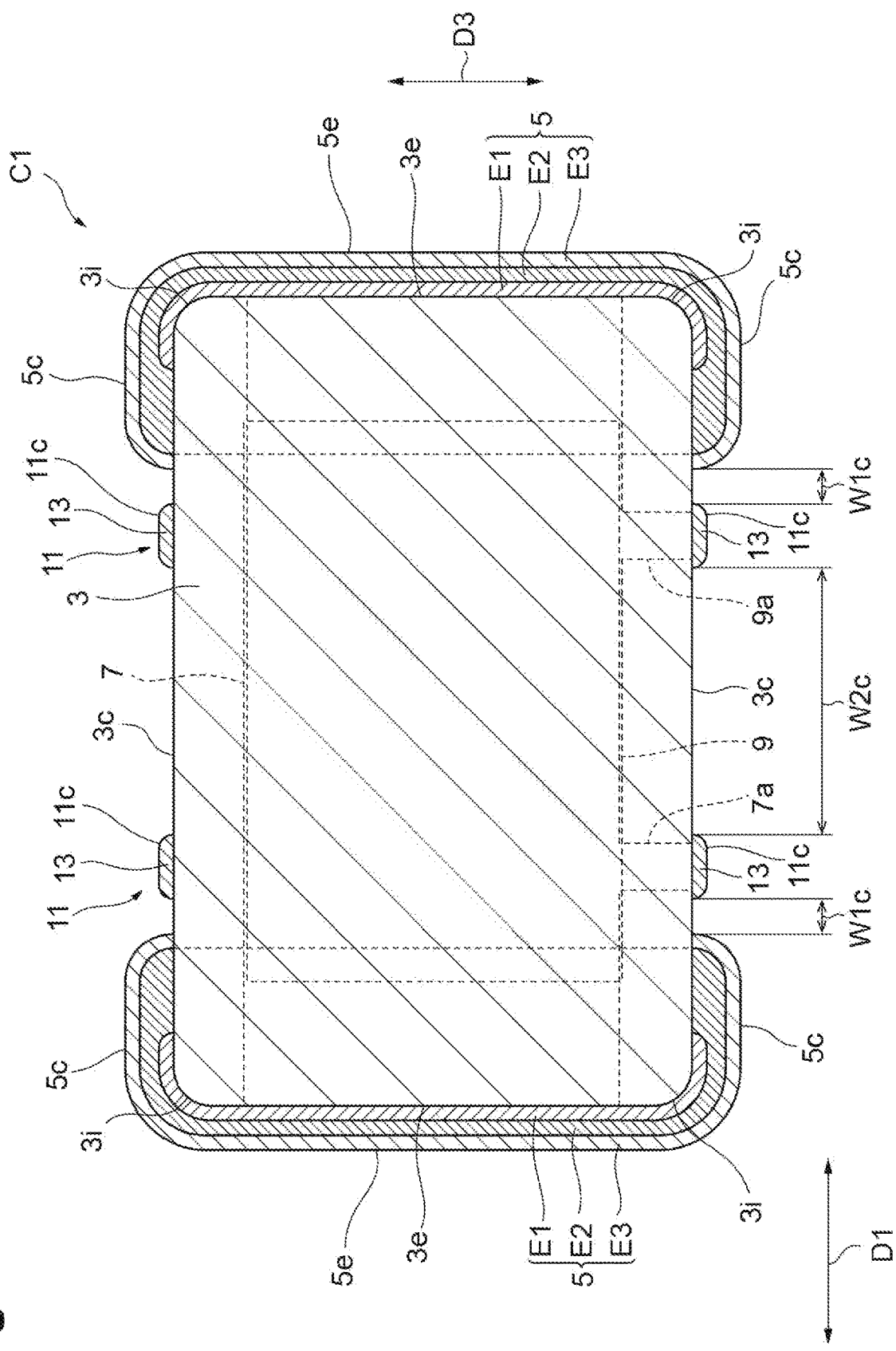
FIG. 9 is a view illustrating a cross-sectional configuration of a multilayer capacitor according to another modified example of the first example.
Figure 10:
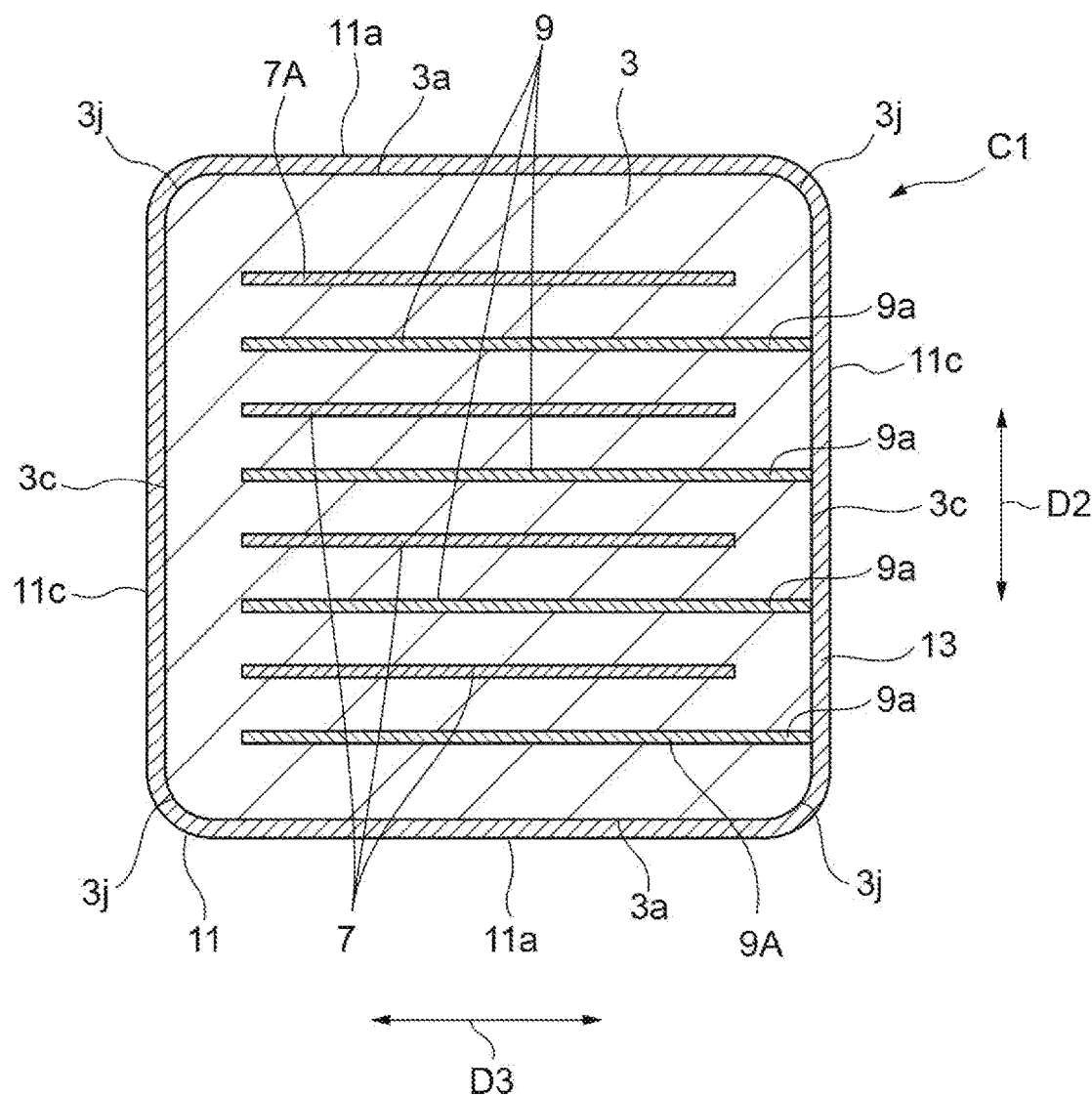
FIG. 10 is a view illustrating a cross-sectional configuration of the multilayer capacitor according to the other modified example of the first example.

Next, a configuration of a multilayer capacitor C1 according to another modified example of the first example will be described with reference to FIGS. 9 and 10. FIGS. 9 and 10 are views illustrating a cross-sectional configuration of a multilayer capacitor according to the other modified example of the first example.

The multilayer capacitor C1 according to the other modified example is generally similar to or the same as the multilayer capacitor C1 according to the one modified example described above. However, the other modified example is different from the above-described one modified example in a configuration of the internal electrodes 9. Hereinafter, differences between the above-described one modified example and the other modified example will be mainly described. In FIG. 9, for the sake of explanation, the internal electrodes 7 and 9 are intentionally illustrated so as to deviate from each other in the third direction D3.

Each of the plurality of internal electrodes 9 includes one connection portion 9a. Each internal electrode 9 includes only one connection portion 9a. The connection portion 9a is exposed to the side surface 3c to which the connection portion 7a is exposed. The connection portion 7a and the connection portion 9a are exposed to the same side surface 3c. The connection portion 9a includes an end exposed to the side surface 3c to which the connection portion 7a is exposed. The connection portion 9a is physically and electrically connected to the portion 11c disposed on the one side surface 3c, at the end exposed to the side surface 3c to which the connection portion 7a is exposed.

In the multilayer capacitor C1 according to the other modified example, the internal electrode 7 is physically connected to the portion 11c included in the corresponding external conductor 11 and located on the one side surface 3c. The internal electrode 9 is physically connected to the portion 11c included in the corresponding external conductor 11 and located on the one side surface 3c.

Second Example

Figure 11:
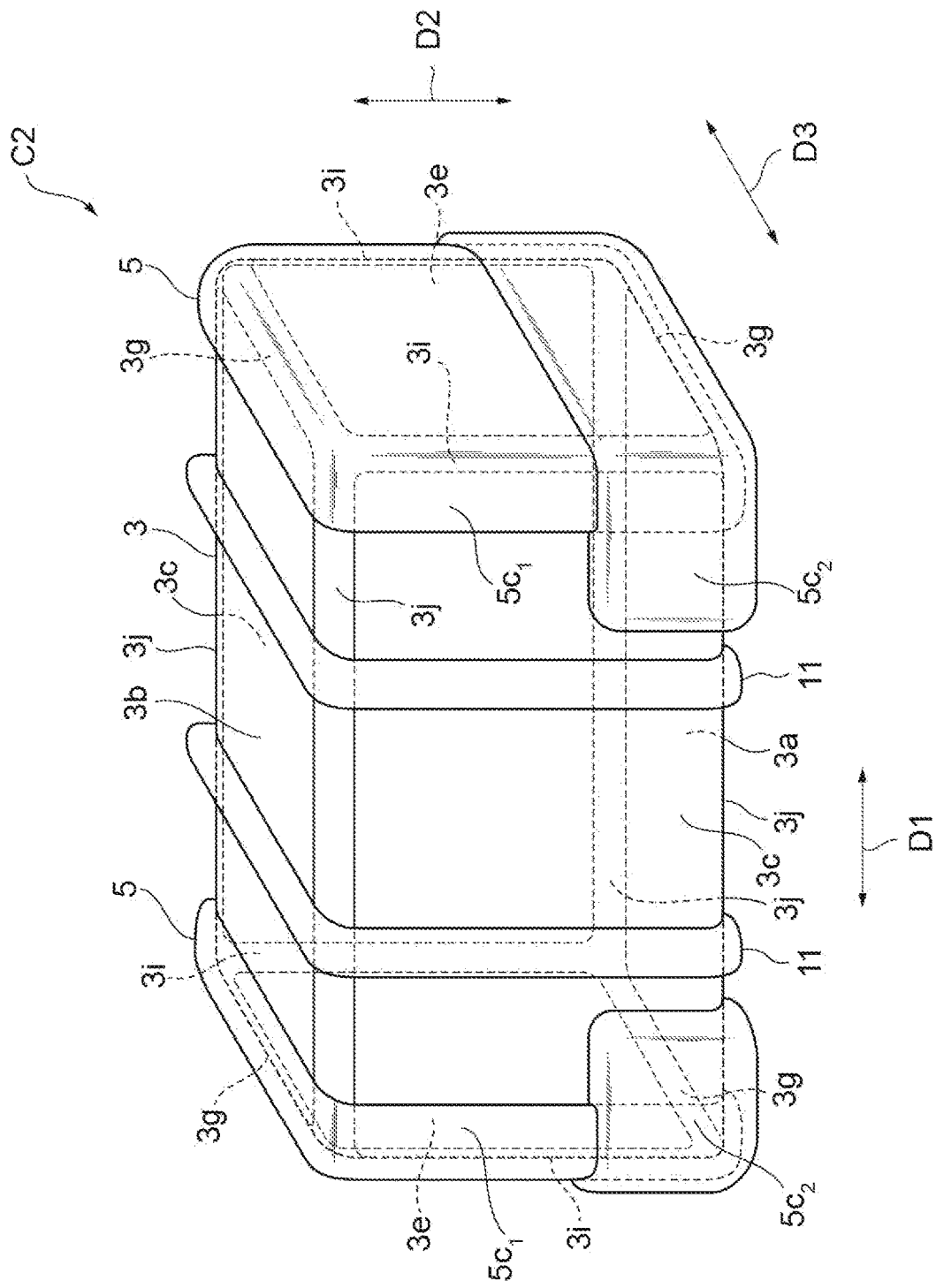
FIG. 11 is a perspective view of a multilayer capacitor according to a second example.

A configuration of a multilayer capacitor C2 according to the second example will be described with reference to FIGS. 11 to 15. FIG. 11 is a perspective view of a multilayer capacitor according to the second example. FIGS. 12, 13, 14, and 15 are views illustrating a cross-sectional configuration of the multilayer capacitor according to the second example.

In the second example, an electronic component includes, for example, the multilayer capacitor C2. The multilayer capacitor C2 is generally similar to or the same as the multilayer capacitor C1. However, the multilayer capacitor C2 is different from the multilayer capacitor C1 in a configuration of the plurality of external electrodes 5 and the internal electrodes 7 and 9. Hereinafter, differences between the multilayer capacitor C1 and the multilayer capacitor C2 will be mainly described.

As illustrated in FIGS. 11 to 15, the multilayer capacitor C2 includes an element body 3 of a rectangular parallelepiped shape, a plurality of external electrodes 5, a plurality of internal electrodes 7, a plurality of internal electrodes 9, and a plurality of external conductors 11. For example, the multilayer capacitor C2 includes a pair of external electrodes 5 and a pair of external conductors 11. The element body 3 includes a pair of main surfaces 3a and 3b opposing each other, a pair of side surfaces 3c opposing each other, and a pair of end surfaces 3e opposing each other. In the multilayer capacitor C2, the main surface 3a opposes the electronic device. The main surface 3a is arranged to constitute a mounting surface. The main surface 3a is the mounting surface.

Each of the main surfaces 3a and 3b also includes a side surface included in the element body 3. The side surface of the element body 3 includes the pair of main surfaces 3a and 3b and the pair of side surfaces 3c. For example, when one side surface 3c includes a first side surface, the other side surface 3c may include a second side surface, the main surface 3a may include a third side surface, and the main surface 3b may include a fourth side surface.

Each external electrode 5 includes a plurality of electrode portion 5a, 5b, 5c, and 5e. The electrode portion 5a is disposed on the main surface 3a. The electrode portion 5b is disposed on the main surface 3b. Each of the electrode portions 5a and 5b may be disposed on a corresponding ridge portion 3g of the plurality of ridge portions 3g. The electrode portion 5c is disposed on the side surface 3c. The electrode portion 5c may be disposed on the ridge portion 3i. The electrode portion 5e is disposed on the end surface 3e. The external electrode 5 also includes an electrode portion disposed on the ridge portion 3j.

Figure 13:
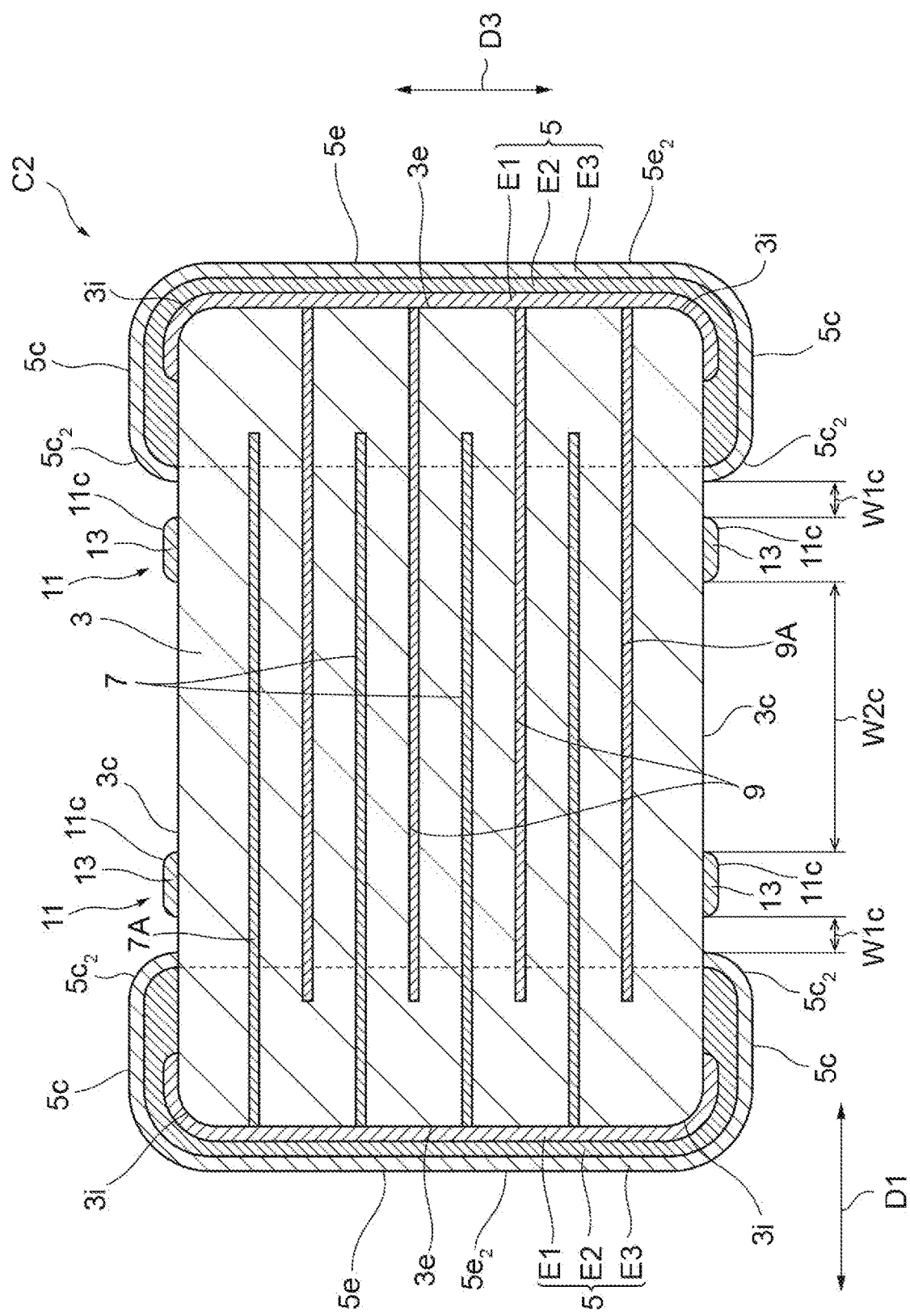
FIG. 13 is a view illustrating a cross-sectional configuration of the multilayer capacitor according to the second example.
Figure 14:
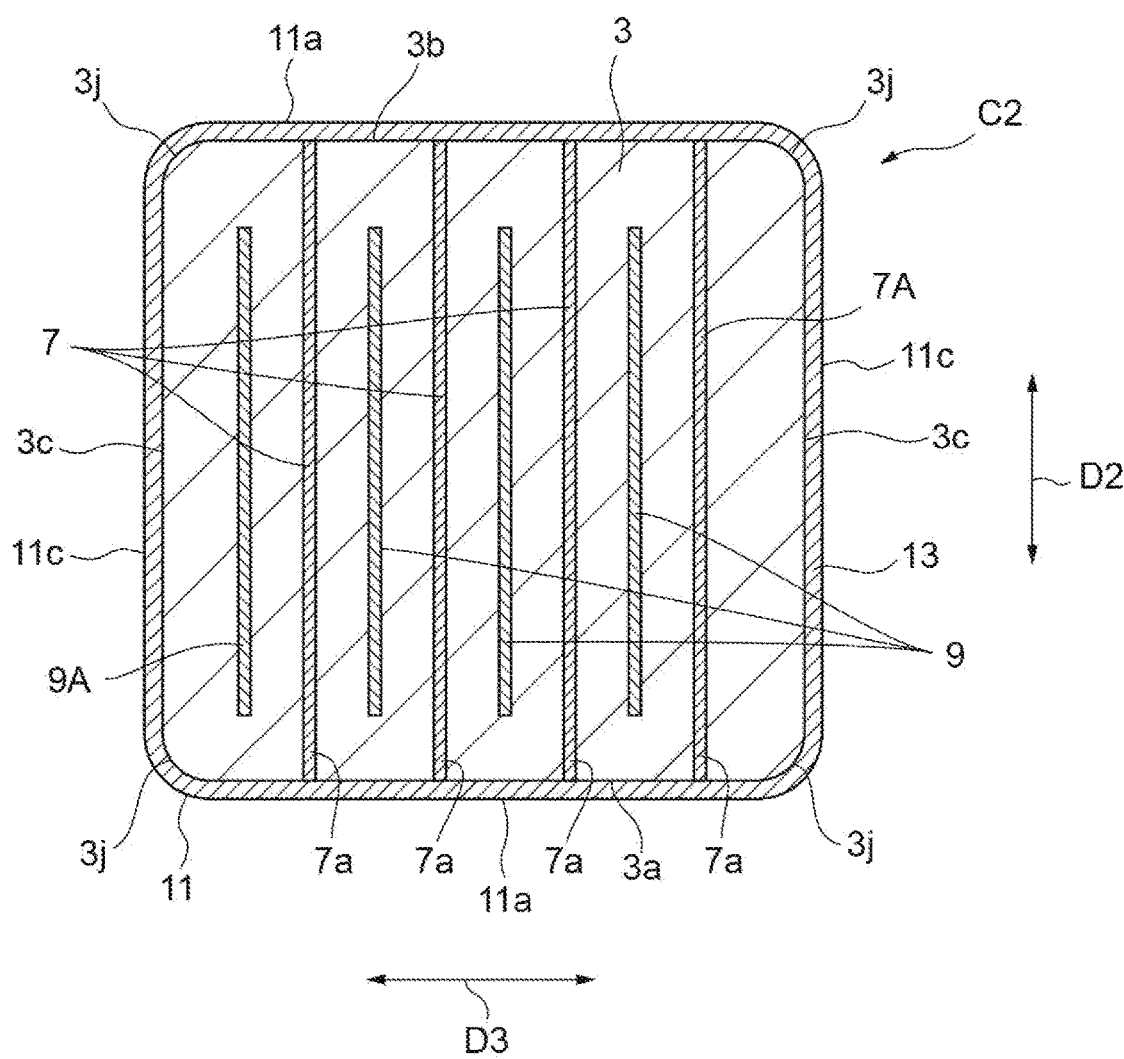
FIG. 14 is a view illustrating a cross-sectional configuration of the multilayer capacitor according to the second example.
Figure 15:
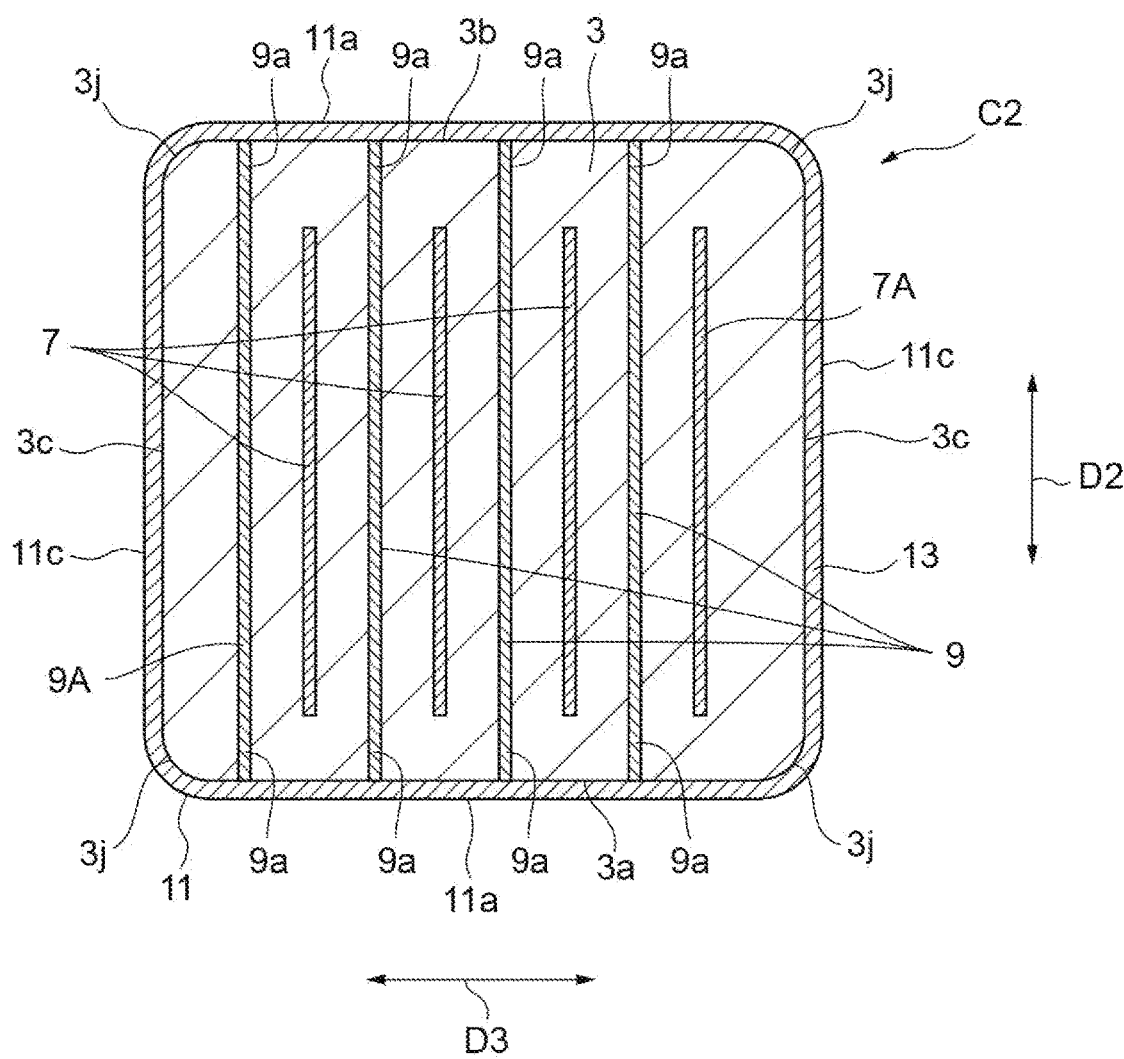
FIG. 15 is a view illustrating a cross-sectional configuration of the multilayer capacitor according to the second example.

Each external electrode 5 is formed on five surfaces of the pair of main surfaces 3a and 3b, the pair of side surfaces 3c, and the end surface 3e as well as the ridge portions 3g, 3i, and 3j. The electrode portions 5a, 5b, 5c, and 5e adjacent to each other are physically and electrically connected to each other. As illustrated in FIGS. 13 and 14, the external electrode 5 includes a first electrode layer E1, a second electrode layer E2, and a third electrode layer E3. Each of the electrode portions 5a, 5c, and 5e includes the first electrode layer E1, the second electrode layer E2, and the third electrode layer E3. The electrode portion 5b includes the first electrode layer E1 and the third electrode layer E3.

The first electrode layer E1 of the electrode portion 5b is disposed on the main surface 3b and on the ridge portion 3g. The first electrode layer E1 of the electrode portion 5b covers a part of the main surface 3b and the entire ridge portion 3g. The first electrode layer E1 of the electrode portion 5b is in contact with the above-described part of the main surface 3b and the entire ridge portion 3g. In the electrode portion 5a, the first electrode layer E1 is in direct contact with the element body 3. The above-described part of the main surface 3b includes a partial region, of the main surface 3b, closer to the end surface 3e. The first electrode layer E1 of the electrode portion 5b is located on the main surface 3b. The first electrode layer E1 may not be formed on the main surface 3b. The first electrode layer E1 may not be disposed on the main surface 3b. The main surface 3b includes a region covered with the first electrode layer E1 and a region exposed from the first electrode layer E1.

The third electrode layer E3 of the electrode portion 5b is disposed on the first electrode layer E1. In the electrode portion 5b, the third electrode layer E3 covers the first electrode layer E1. In the electrode portion 5b, the third electrode layer E3 is in contact with the first electrode layer E1. In the electrode portion 5b, the third electrode layer E3 is in direct contact with the first electrode layer E1. The third electrode layer E3 of the electrode portion 5b is located on the main surface 3b. The electrode portion 5b does not include the second electrode layer E2. The main surface 3b includes no portion covered with the second electrode layer E2.

The second electrode layer E2 of the electrode portion 5c is disposed on the first electrode layer E1 and on the side surface 3c. In the electrode portion 5c, the second electrode layer E2 covers a part of the first electrode layer E1 and a part of the side surface 3c. In the electrode portion 5c, the second electrode layer E2 is in direct contact with the above-described part of the first electrode layer E1 and the above-described part of the side surface 3c. The second electrode layer E2 of the electrode portion 5c covers the above-described part of the first electrode layer E1 of the electrode portion 5c. The above-described part of the side surface 3c includes, for example, a corner region, of the side surface 3c, closer to the main surface 3a and the end surface 3e. The side surface 3c includes a region covered with the second electrode layer E2 and a region exposed from the second electrode layer E2. The second electrode layer E2 of the electrode portion 5c includes a portion directly covering the first electrode layer E1 and a portion directly covering the side surface 3c. In the electrode portion 5c, the portion included in the second electrode layer E2 and directly covering the first electrode layer E1 indirectly covers the side surface 3c. The first electrode layer E1 of the electrode portion 5c includes a portion covered with the second electrode layer E2 and a portion exposed from the second electrode layer E2. The second electrode layer E2 of the electrode portion 5c is located on the side surface 3c.

The third electrode layer E3 of the electrode portion 5c is disposed on the first electrode layer E1 and the second electrode layer E2. In the electrode portion 5c, the third electrode layer E3 covers the entire second electrode layer E2 and the entire portion included in the first electrode layer E1 and exposed from the second electrode layer E2. In the electrode portion 5c, the third electrode layer E3 is in contact with the entire second electrode layer E2 and the entire portion included in the first electrode layer E1 and exposed from the second electrode layer E2. In the electrode portion 5c, the third electrode layer E3 is in direct contact with the first electrode layer E1 and the second electrode layer E2. The third electrode layer E3 of the electrode portion 5c is located on the side surface 3c.

The electrode portion 5c includes a plurality of regions $5c_1$ and $5c_2$. For example, the electrode portion 5c includes only two regions $5c_1$ and $5c_2$. The region $5c_2$ is positioned closer to the main surface 3a than the region $5c_1$. The region $5c_1$ includes the first electrode layer E1 and the third electrode layer E3. The region $5c_1$ does not include the second electrode layer E2. The region $5c_2$ includes the first electrode layer E1, the second electrode layer E2, and the third electrode layer E3. The region $5c_1$ includes a region where the first electrode layer E1 is exposed from the second electrode layer E2. The region $5c_2$ includes a region where the first electrode layer E1 is covered with the second electrode layer E2.

The second electrode layer E2 of the electrode portion 5e is disposed on the first electrode layer E1. In the electrode portion 5e, the second electrode layer E2 covers a part of the first electrode layer E1. In the electrode portion 5e, the second electrode layer E2 is in direct contact with the above-described part of the first electrode layer E1. The second electrode layer E2 of the electrode portion 5e covers the above-described part of the first electrode layer E1 of the electrode portion 5e. The above-described part of the end surface 3e includes, for example, a partial region, of the end surface 3e, closer to the main surface 3a. In the electrode portion 5e, the second electrode layer E2 indirectly covers a part of the end surface 3e so that the first electrode layer E1 is located between the second electrode layer E2 and the end surface 3e. The first electrode layer E1 of the electrode portion 5e includes a portion covered with the second electrode layer E2 and a portion exposed from the second electrode layer E2.

The third electrode layer E3 of the electrode portion 5e is disposed on the first electrode layer E1 and the second electrode layer E2. In the electrode portion 5e, the third electrode layer E3 covers the entire second electrode layer E2 and the entire portion included in the first electrode layer E1 and exposed from the second electrode layer E2. In the electrode portion 5e, the third electrode layer E3 is in direct contact with the entire second electrode layer E2 and the entire portion included in the first electrode layer E1 and exposed from the second electrode layer E2. In the electrode portion 5e, the third electrode layer E3 is in direct contact with the first electrode layer E1 and the second electrode layer E2. The third electrode layer E3 of the electrode portion 5e is located on the end surface 3e.

The electrode portion 5e includes a plurality of regions $5e_1$ and $5e_2$. For example, the electrode portion 5e includes only two regions $5e_1$ and $5e_2$. The region $5e_2$ is positioned closer to the main surface 3a than the region $5e_1$. The region $5e_1$ includes the first electrode layer E1 and the third electrode layer E3. The region $5e_1$ does not include the second electrode layer E2. The region $5e_2$ includes the first electrode layer E1, the second electrode layer E2, and the third electrode layer E3. In the electrode portion 5e, the third electrode layer E3 covers the entire end surface 3e when viewed from the first direction D1. For example, the third electrode layer E3 indirectly covers the entire end surface 3e. The region $5e_1$ includes a region where the first electrode layer E1 is exposed from the second electrode layer E2. The region $5e_2$ includes a region where the first electrode layer E1 is covered with the second electrode layer E2.

In the multilayer capacitor C2, the second electrode layer E2 continuously covers only a part of the main surface 3a, only a part of the end surface 3e, and only a part of each of the pair of side surfaces 3c. The second electrode layer E2 includes a portion continuously covering only a part of the main surface 3a, only a part of the end surface 3e, and only a part of each of the pair of side surfaces 3c. The above-described part of the end surface 3e includes a part of the end surface 3e closer to the main surface 3a. The above-described part of the side surface 3c includes a part of the side surface 3c closer to the main surface 3a. The second electrode layer E2 covers the entire one ridge portion 3g, only a part of the ridge portion 3i, and only a part of the ridge portion 3j. A portion of the first electrode layer E1 covering the ridge portion 3i is partially exposed from the second electrode layer E2. For example, the first electrode layer E1 included in the regions $5c_1$ and $5e_1$ is exposed from the second electrode layer E2.

The external conductor 11 includes a pair of portions 11a and a pair of portions 11c. For example, the pair of portions 11a includes a portion 11a on the main surface 3a and a portion 11a on the main surface 3b. For example, the pair of portions 11a and the pair of portions 11c are provided integrally with each other. For example, each external conductor 11 is also disposed on each ridge portion 3j.

As illustrated in FIGS. 12 to 15, the internal electrodes 7 and the internal electrodes 9 are disposed in different positions (layers) in the third direction D3. The internal electrodes 7 and the internal electrodes 9 are alternately disposed in the element body 3 to oppose each other in the third direction D3 with an interval therebetween. The plurality of internal electrodes 7 and the plurality of internal electrodes 9 are alternately disposed in the third direction D3. The plurality of internal electrodes 7 and the plurality of internal electrodes 9 are disposed in the element body 3 to be distributed in the third direction D3. Each of the plurality of internal electrodes 7 and the plurality of internal electrodes 9 is located in a plane substantially parallel to the side surfaces 3c. Each of the plurality of internal electrodes 7 and the plurality of internal electrodes 9 is disposed to extend in a direction intersecting the main surfaces 3a and 3b. For example, each of the plurality of internal electrodes 7 and the plurality of internal electrodes 9 is disposed to extend in a direction substantially orthogonal to the main surfaces 3a and 3b. The internal electrode 7 and the internal electrode 9 oppose each other in the third direction D3. The direction in which the internal electrode 7 and the internal electrode 9 oppose each other, that is, the third direction D3 is orthogonal to a direction parallel to the side surfaces 3c (second direction D2 and first direction D1).

Figure 12:
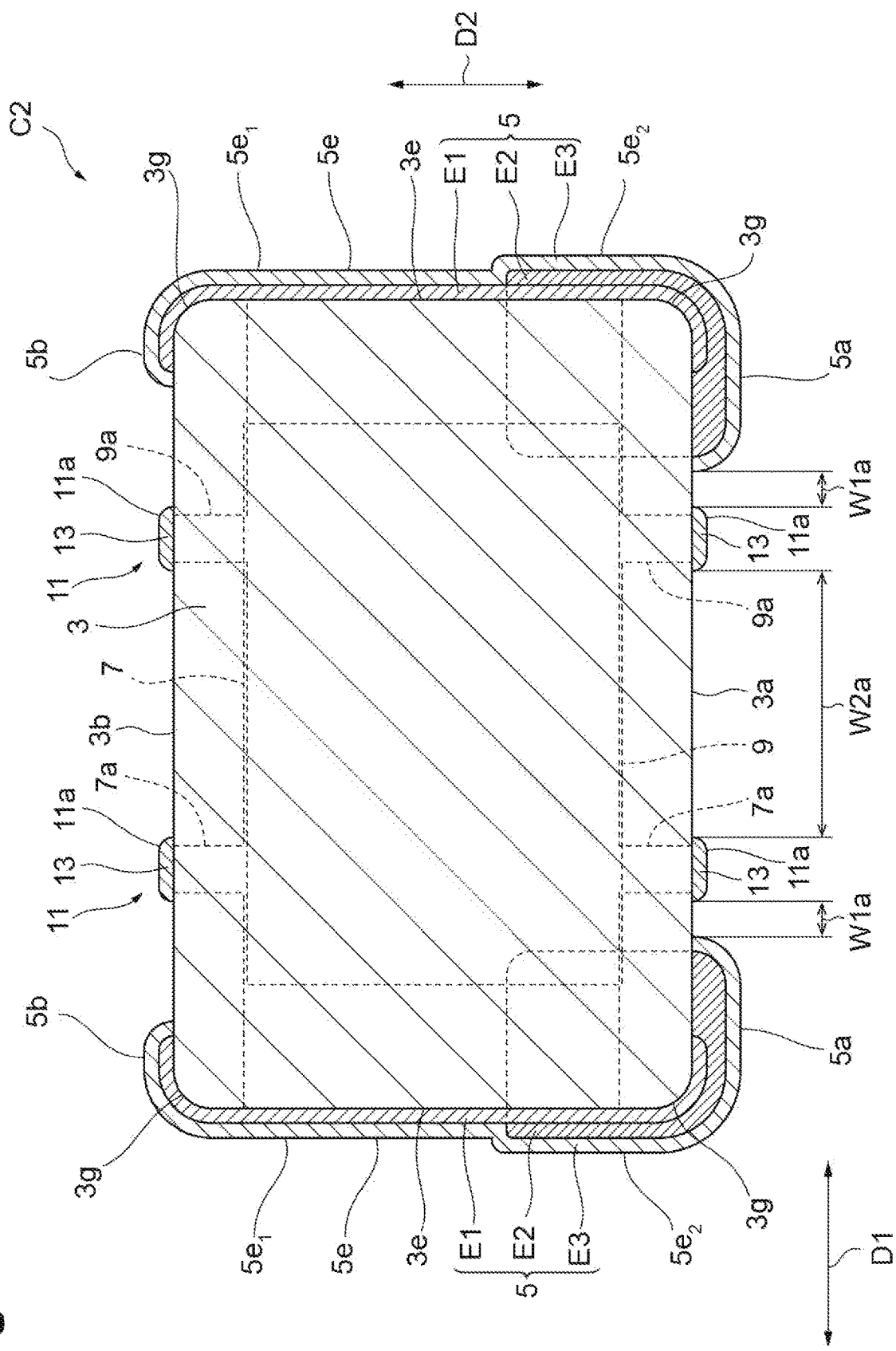
FIG. 12 is a view illustrating a cross-sectional configuration of the multilayer capacitor according to the second example.

In FIG. 12, for the sake of explanation, the internal electrodes 7 and 9 are intentionally illustrated so as to deviate from each other in the second direction D2.

The internal electrode 7 includes a pair of connection portions 7a. One connection portion 7a of the pair of connection portions 7a is exposed to the main surface 3a. The one connection portion 7a includes an end exposed to the main surface 3a. The one connection portion 7a is physically and electrically connected to the portion 11a disposed on the main surface 3a at the end exposed to the main surface 3a. Another connection portion 7a of the pair of connection portions 7a is exposed to the main surface 3b. The other connection portion 7a includes an end exposed to the main surface 3b. The other connection portion 7a is physically and electrically connected to the portion 11a disposed on the main surface 3b at the end exposed to the main surface 3b. The internal electrode 7 is physically connected to the corresponding external conductor 11 at a plurality of portions of the internal electrode 7. For example, at least one of the plurality of internal electrodes 7 may be physically connected to the corresponding external conductor 11.

The internal electrode 9 includes a pair of connection portions 9a. One connection portion 9a of the pair of connection portions 9a is exposed to the main surface 3a. The one connection portion 9a includes an end exposed to the main surface 3a. The one connection portion 9a is physically and electrically connected to the portion 11a disposed on the main surface 3a at the end exposed to the main surface 3a. Another connection portion 9a of the pair of connection portions 9a is exposed to the main surface 3b. The other connection portion 9a includes an end exposed to the main surface 3b. The other connection portion 9a is physically and electrically connected to the portion 11a disposed on the main surface 3b at the end exposed to the main surface 3b. The internal electrode 9 is connected to the external conductor 11 (portion 11a) different from the external conductor 11 (portion 11a) to which the internal electrode 7 is connected. The internal electrode 9 is physically connected to the corresponding external conductor 11 at a plurality of portions of the internal electrode 9. For example, at least one of the plurality of internal electrodes 9 may be physically connected to the corresponding external conductor 11. The connection portion 7a and the connection portion 9a exposed to the same main surface 3a are separated from each other in the first direction D1. The connection portion 7a and the connection portion 9a exposed to the same main surface 3b are separated from each other in the first direction D1.

The plurality of internal electrodes 7 include an internal electrode 7A adjacent to the other side surface 3c. The internal electrode 7A opposes the second electrode layer E2 included in the electrode portion 5a that is electrically connected to the internal electrode 9 and located on the other side surface 3c, for example, in the third direction D3. When the internal electrode 7A and the second electrode layer E2 that is electrically connected to the internal electrode 9 and located on the other side surface 3c are viewed from, for example, the second direction D2, the internal electrode 7A and the second electrode layer E2 that is electrically connected to the internal electrode 9 and located on the other side surface 3c overlap each other. Therefore, an electric field tends to be generated between the internal electrode 7A and the second electrode layer E2 that is electrically connected to the internal electrode 9 and located on the other side surface 3c.

The plurality of internal electrodes 9 include an internal electrode 9A adjacent to the one side surface 3c. The internal electrode 9A opposes the second electrode layer E2 included in the electrode portion 5a that is electrically connected to the internal electrode 7 and located on the one side surface 3c, for example, in the third direction D3. When the internal electrode 9A and the second electrode layer E2 that is electrically connected to the internal electrode 7 and located on the one side surface 3c are viewed from, for example, the third direction D3, the internal electrode 9A and the second electrode layer E2 that is electrically connected to the internal electrode 7 and located on the one side surface 3c overlap each other. Therefore, an electric field tends to be generated between the internal electrode 9A and the second electrode layer E2 that is electrically connected to the internal electrode 7 and located on the one side surface 3c.

The plurality of internal electrodes 7 oppose the second electrode layer E2 included in the electrode portion 5a that is electrically connected to the internal electrode 9 and located on the main surface 3a, for example, in the second direction D2. When the plurality of internal electrodes 7 and the second electrode layer E2 that is electrically connected to the internal electrode 9 and located on the main surface 3a are viewed from, for example, the second direction D2, the plurality of internal electrodes 7 and the second electrode layer E2 that is electrically connected to the internal electrode 9 and located on the main surface 3a overlap each other. Therefore, an electric field tends to be generated between the plurality of internal electrodes 7 and the second electrode layer E2 that is electrically connected to the internal electrode 9 and located on the main surface 3a.

The plurality of internal electrodes 9 oppose the second electrode layer E2 included in the electrode portion 5a that is electrically connected to the internal electrode 7 and located on the main surface 3a, for example, in the second direction D2. When the plurality of internal electrodes 9 and the second electrode layer E2 that is electrically connected to the internal electrode 7 and located on the main surface 3a are viewed from, for example, the second direction D2, the plurality of internal electrodes 9 and the second electrode layer E2 that is electrically connected to the internal electrode 7 and located on the main surface 3a overlap each other. Therefore, an electric field tends to be generated between the plurality of internal electrodes 9 and the second electrode layer E2 that is electrically connected to the internal electrode 7 and located on the main surface 3a.

The plurality of internal electrodes 7 oppose the external conductor 11 (conductor layer 13) that is electrically connected to the internal electrode 9, for example, in the second direction D2. Therefore, an electric field tends to be generated between the plurality of internal electrodes 7 and the external conductor 11 that is electrically connected to the internal electrode 9.

The plurality of internal electrodes 9 oppose the external conductor 11 (conductor layer 13) that is electrically connected to the internal electrode 7, for example, in the second direction D2. Therefore, an electric field tends to be generated between the plurality of internal electrodes 9 and the external conductor 11 that is electrically connected to the internal electrode 7.

Also in the multilayer capacitor C2, the second electrode layer E2 included in the external electrode 5 and the conductor layer 13 included in the external conductor 11 adjacent to the external electrode 5 in the first direction D1 are electrically connected to each other. Therefore, even when an electric field acts on the second electrode layer E2, metal included in the second electrode layer E2 tends not to be ionized. Migration tends not to occur in the second electrode layer E2.

Even when an electric field acts on the conductor layer 13, the migration tends not to occur in the conductor layer 13.

The one external conductor 11 is located between the external electrode 5 (second electrode layer E2) electrically connected to the one external conductor 11 and the other external conductor 11. Therefore, even when migration occurs in the second electrode layer E2 included in the external electrode 5 electrically connected to the one external conductor 11, the one external conductor 11 prevents the migration from proceeding.

The other external conductor 11 is located between the external electrode 5 (second electrode layer E2) electrically connected to the other external conductor 11 and the one external conductor 11. Therefore, even when migration occurs in the second electrode layer E2 included in the external electrode 5 electrically connected to the other external conductor 11, the other external conductor 11 prevents the migration from proceeding.

Consequently, the multilayer capacitor C2 also prevents the migration from proceeding.

In the multilayer capacitor C2, the second electrode layer E2 continuously covers a part of the main surface 3a, a part of a corresponding end surface 3e of the pair of end surfaces 3e, and a part of each of the pair of side surfaces 3c. The second electrode layer E2 covers only a part of the corresponding end surface 3e. Therefore, the multilayer capacitor C2 decreases ESR.

Figure 16:
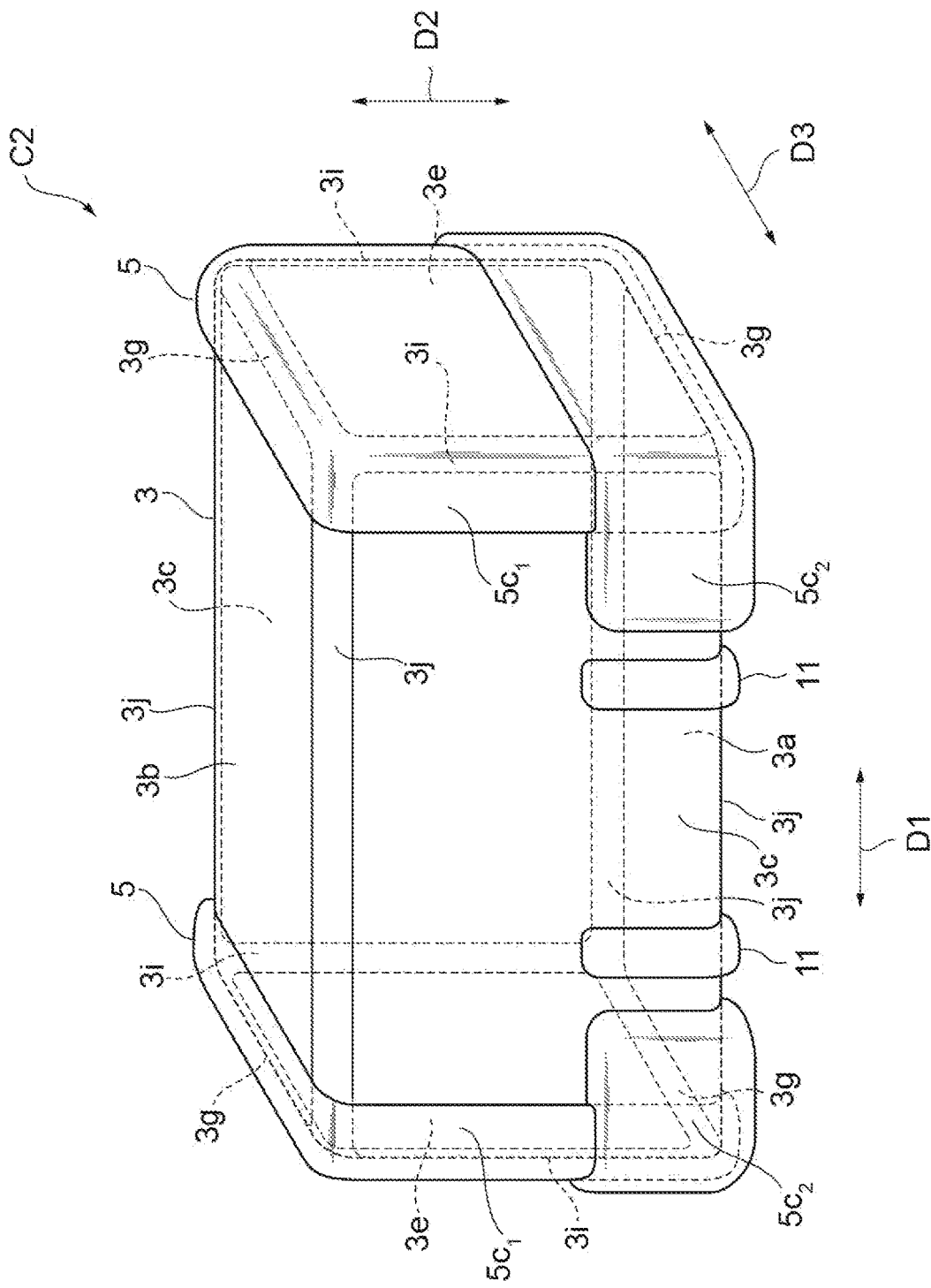
FIG. 16 is a perspective view of a multilayer capacitor according to one modified example of the second example.
Figure 17:
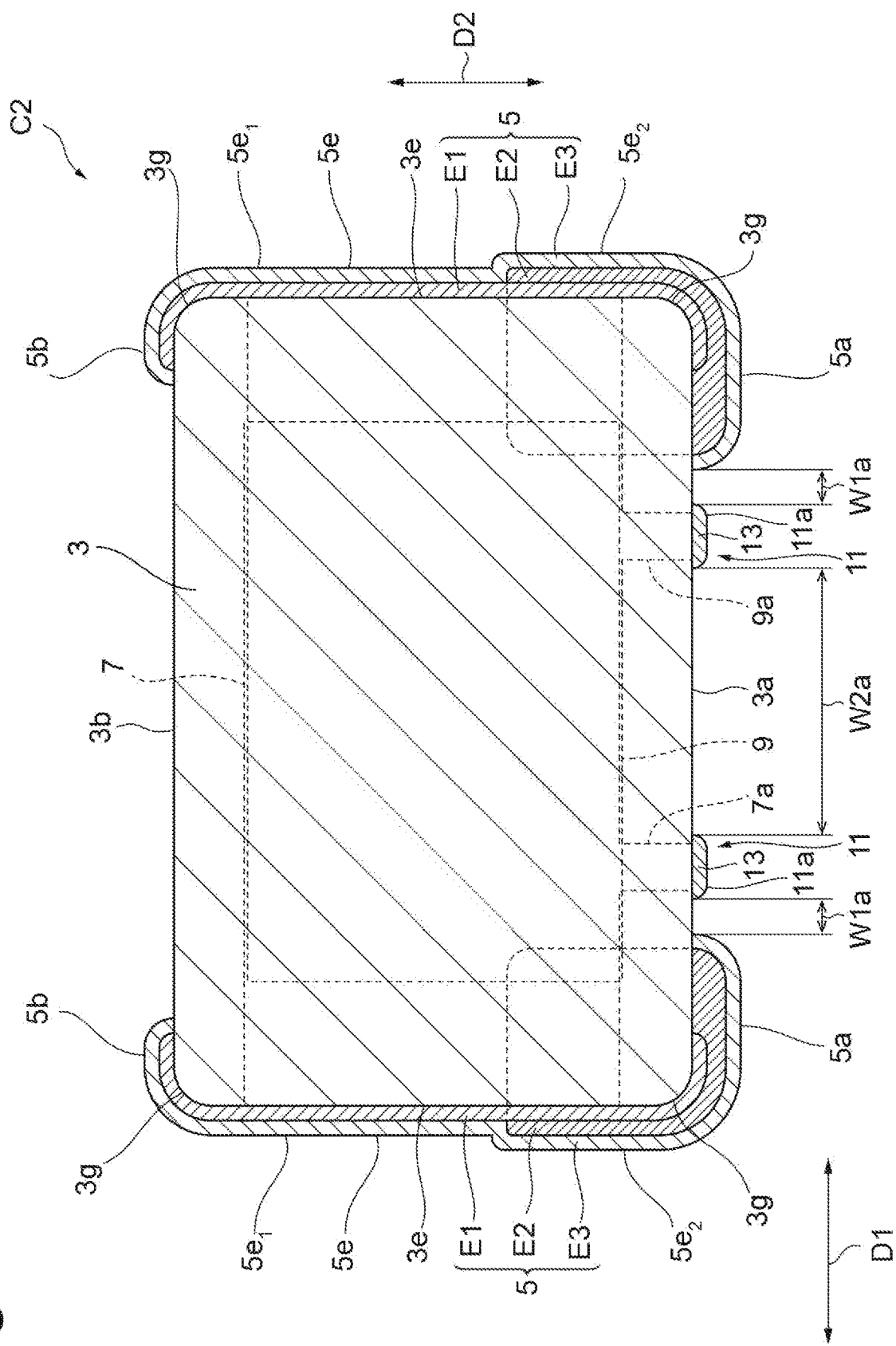
FIG. 17 is a view illustrating a cross-sectional configuration of the multilayer capacitor according to the one modified example of the second example.
Figure 18:
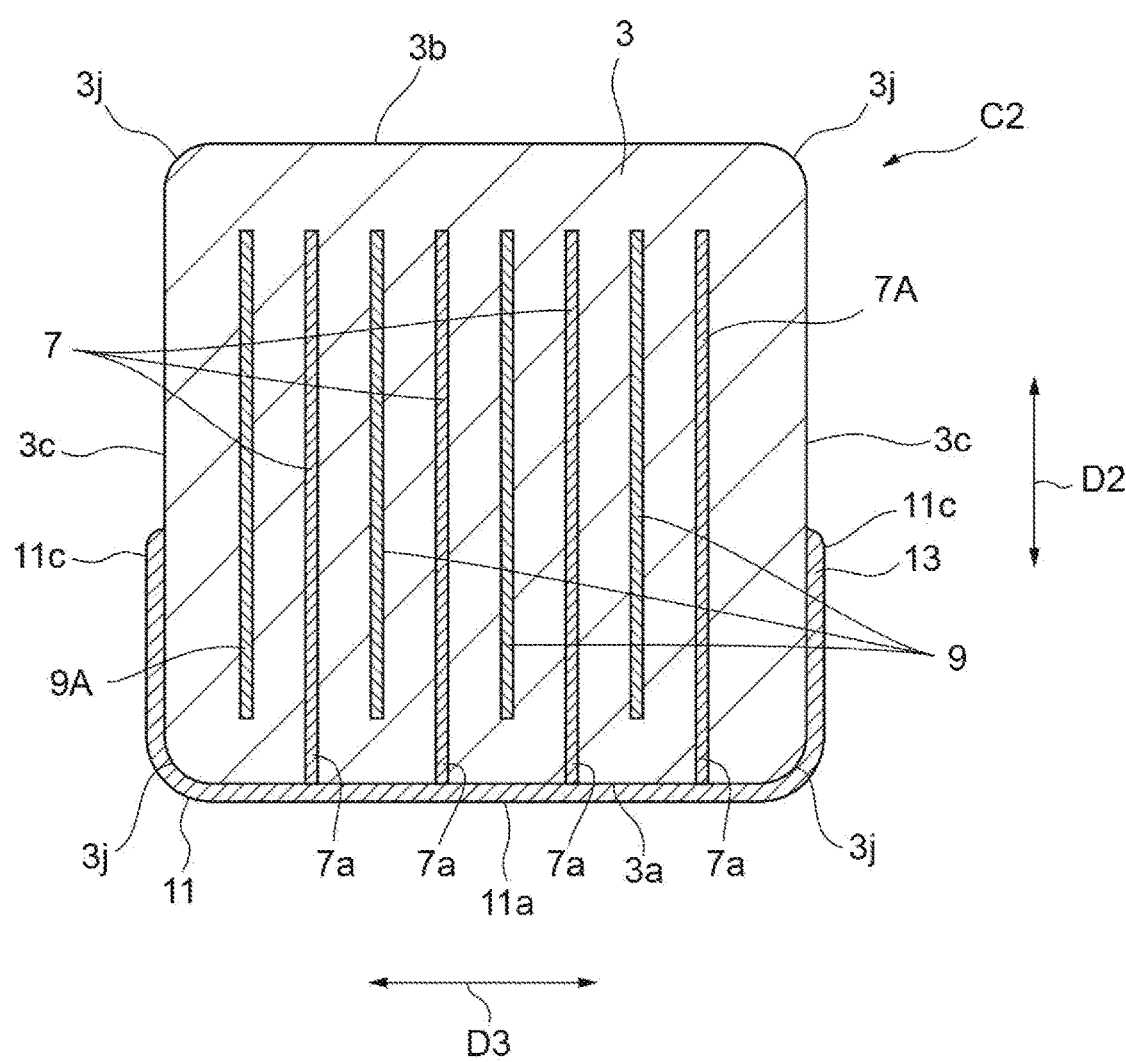
FIG. 18 is a view illustrating a cross-sectional configuration of the multilayer capacitor according to the one modified example of the second example.
Figure 19:
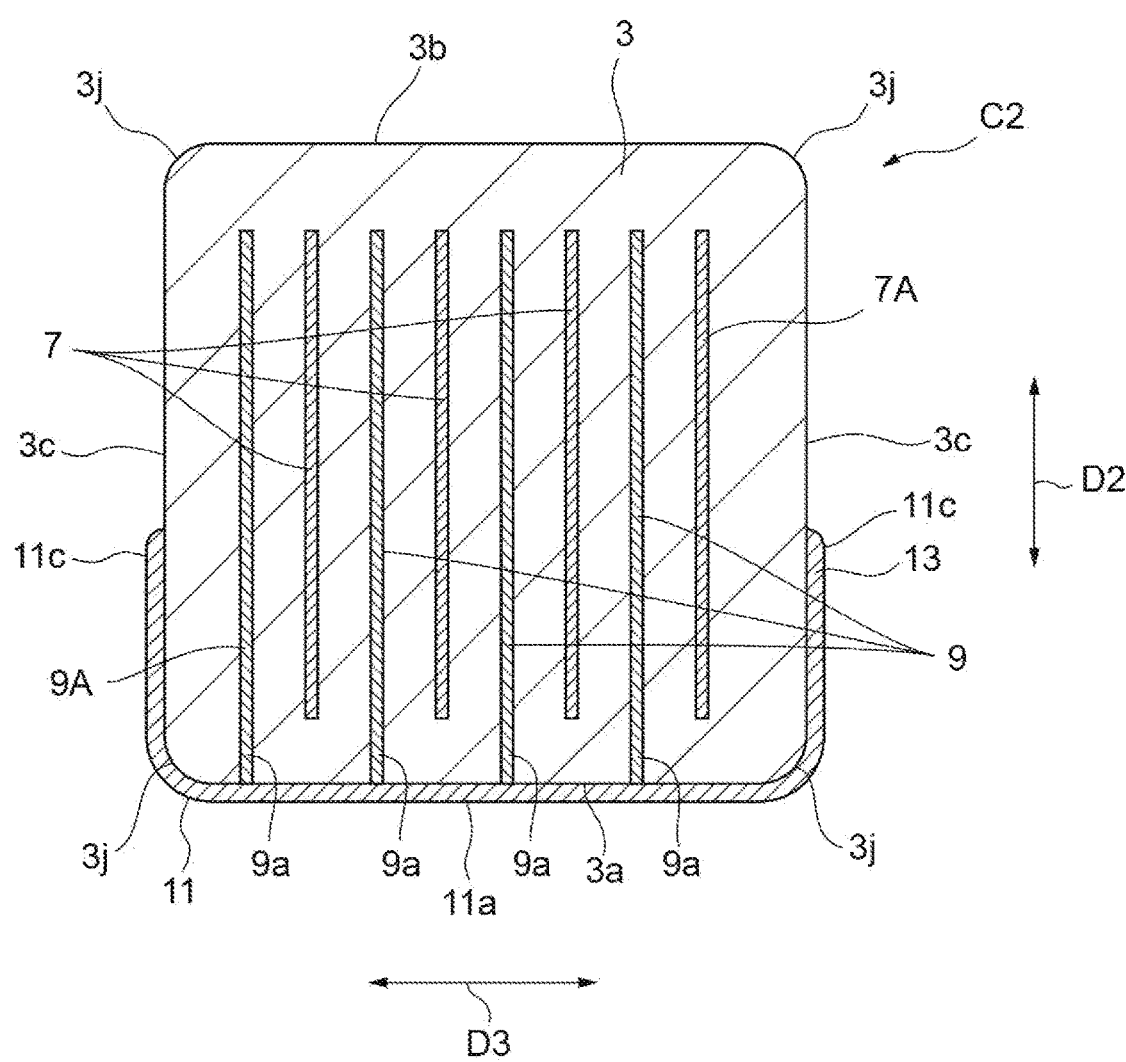
FIG. 19 is a view illustrating a cross-sectional configuration of the multilayer capacitor according to the one modified example of the second example.
Figure 20:
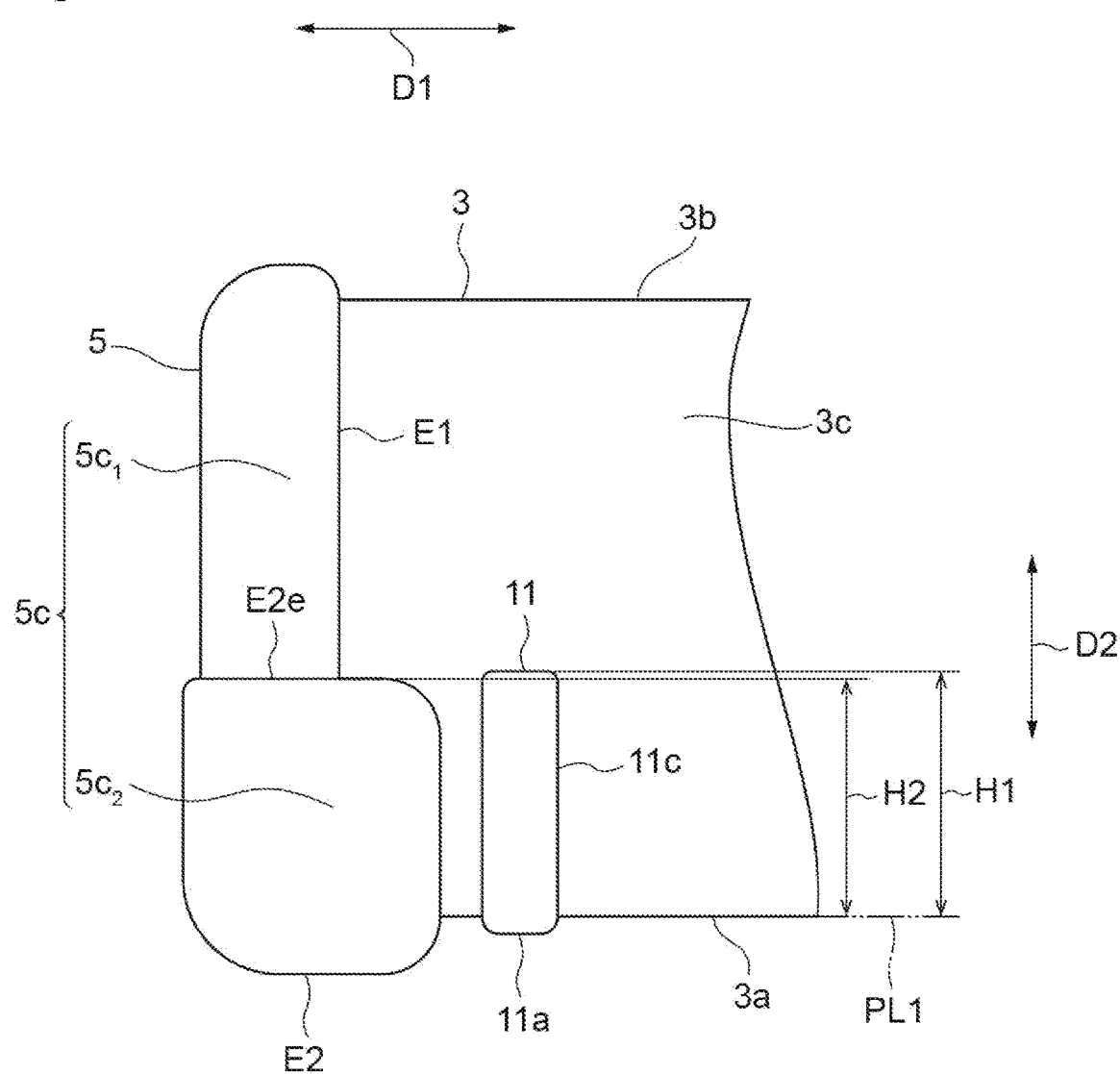
FIG. 20 is a view illustrating an external electrode and an external conductor.

Next, a configuration of a multilayer capacitor C2 according to one modified example of the second example will be described with reference to FIGS. 16 to 20. FIG. 16 is a perspective view of a multilayer capacitor according to the one modified example of the second example. FIGS. 17, 18, and 19 are views illustrating a cross-sectional configuration of the multilayer capacitor according to the one modified example of the second example. FIG. 20 is a view illustrating an external electrode and an external conductor.

The multilayer capacitor C2 according to the one modified example is generally similar to or the same as the multilayer capacitor C2 according to the second example described above. However, the one modified example is different from the above-described second example in a configuration of the internal electrodes 7 and 9 and the plurality of external conductors 11. Hereinafter, differences between the above-described second example and the one modified example will be mainly described. In FIG. 16, for the sake of explanation, the internal electrodes 7 and 9 are intentionally illustrated so as to deviate from each other in the third direction D3.

As illustrated in FIGS. 16, 18, and 19, each external conductor 11 includes one portion 11a and a pair of portions 11c. The portion 11a is disposed on the main surface 3a. The pair of portions 11c are disposed on the pair of side surfaces 3c, respectively. The external conductor 11 is not disposed on the main surface 3b. For example, the portion 11a and the pair of portions 11c are provided integrally with each other. For example, each external conductor 11 is also disposed on each ridge portion 3j adjacent to the main surface 3a.

The portion 11a is separated from an and edge of the electrode portion 5a. The portion 11a extends in the third direction D3 along the end edge of the electrode portion 5a.

Each portion 11c is separated from an and edge of the region $5c_2$ of a corresponding electrode portion 5c of the electrode portions 5c. Each portion 11c extends in the second direction D2 along the end edge of the region $5c_2$. The region $5c_1$ of the electrode portion 5c does not include the second electrode layer E2. Therefore, the portion 11c may not extend in the second direction D2 along the end edge of the region $5c_1$ of the electrode portion 5c. The portion 11c may be disposed at a position corresponding to the region $5c_2$, and may not be disposed at a position corresponding to the region $5c_1$.

As illustrated in FIG. 20, each external conductor 11 is disposed over the main surface 3a and a part of each of the pair of side surfaces 3c. Each portion 11c is located on the above-described part of the corresponding side surface 3c. A height H1 of each portion 11c in the second direction D2 is larger than or equal to a height H2 of the second electrode layer E2 in the second direction D2. The height H2 is, for example, a height of the second electrode layer E2 included in the region $5c_2$ of the electrode portion 5c. Each of the heights H1 and H2 is, for example, a height in the second direction D2 from a reference surface PL1. The reference surface PL1 includes the main surface 3a. In FIG. 20, illustration of the third electrode layer E3 is omitted.

As illustrated in FIGS. 17 and 18, the internal electrode 7 includes one connection portion 7a. For example, the internal electrode 7 includes only the connection portion 7a exposed to the main surface 3a. The internal electrode 7 (connection portion 7a) is physically connected to only the portion 11a included in a corresponding external conductor 11 of the external conductors 11.

As illustrated in FIGS. 17 and 19, the internal electrode 9 includes one connection portion 9a. For example, the internal electrode 9 includes only the connection portion 9a exposed to the main surface 3a. The internal electrode 9 (connection portion 9a) is physically connected to only the portion 11a included in a corresponding external conductor 11 of the external conductors 11.

The internal electrodes 7 and 9 are not exposed to the main surface 3b.

In the multilayer capacitor C2 according to the one modified example, each of the internal electrode 7 and the internal electrode 9 is physically connected to the portion 11a included in the corresponding external conductor 11. Therefore, even in a configuration in which the internal electrode 7 and the internal electrode 9 oppose each other in the third direction D3, the multilayer capacitor C2 according to the one modified example reliably prevents migration from proceeding from the second electrode layer E2.

In the multilayer capacitor C2 according to the one modified example, each external conductor 11 is disposed over the main surface 3a and a part of each of the pair of side surfaces 3c. Each external conductor 11 does not need to be formed on the main surface 3b. Each portion 11c may be formed only on the above-described part of the corresponding side surface 3c. Therefore, the multilayer capacitor C2 according to the one modified example realizes easy formation of the external conductors 11, and reliably prevents the migration from proceeding.

In the multilayer capacitor C2 according to the one modified example, the height H1 is larger than or equal to the height H2. Therefore, the multilayer capacitor C2 according to the one modified example reliably prevents the migration from proceeding.

Figure 21:
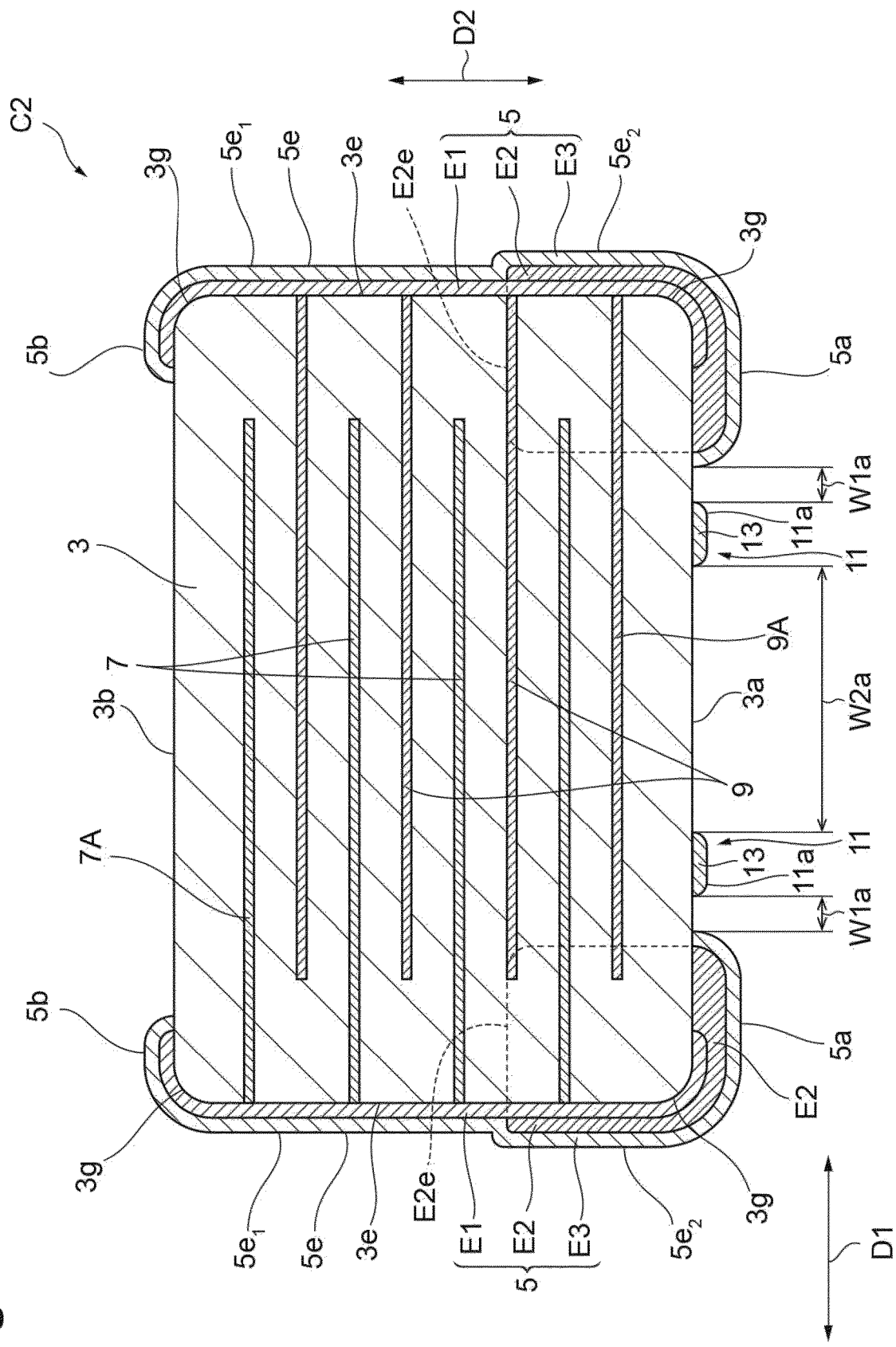
FIG. 21 is a view illustrating a cross-sectional configuration of a multilayer capacitor according to another modified example of the second example.
Figure 22:
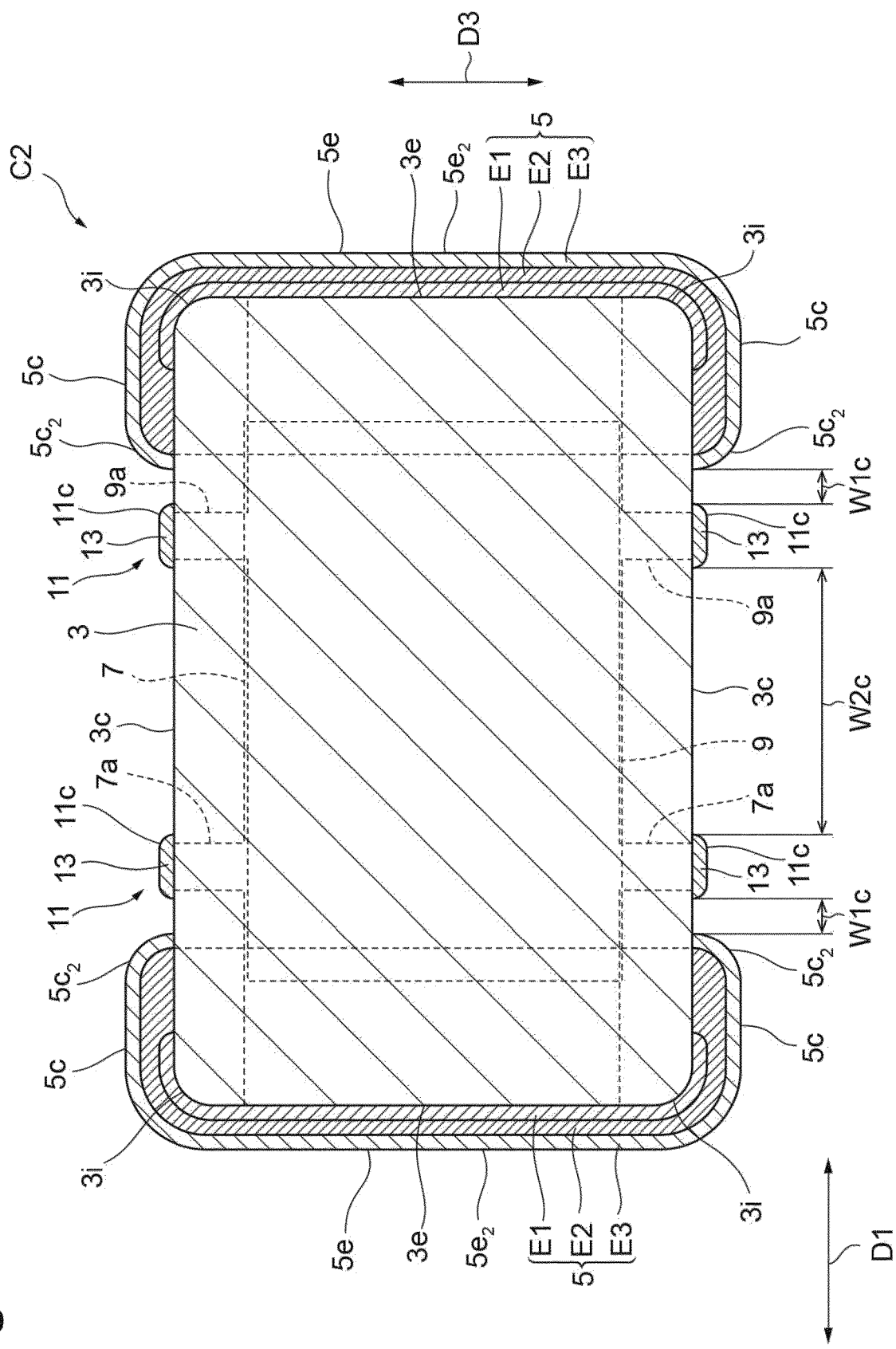
FIG. 22 is a view illustrating a cross-sectional configuration of the multilayer capacitor according to the other modified example of the second example.

Next, a configuration of a multilayer capacitor C2 according to another modified example of the second example will be described with reference to FIGS. 21 and 24. FIGS. 21, 22, 23, and 24 are views illustrating a cross-sectional configuration of a multilayer capacitor according to the other modified example of the second example.

The multilayer capacitor C2 according to the other modified example is generally similar to or the same as the multilayer capacitor C2 according to the one modified example described above. However, the other modified example is different from the above-described one modified example in a configuration of the internal electrodes 7 and 9. Hereinafter, differences between the above-described one modified example and the other modified example will be mainly described. In FIG. 21, for the sake of explanation, the internal electrodes 7 and 9 are intentionally illustrated so as to deviate from each other in the second direction D2.

The internal electrodes 7 and the internal electrodes 9 are disposed in different positions (layers) in the second direction D2, similar to the internal electrodes 7 and 9 included in the multilayer capacitor C1. The internal electrode 7 and the internal electrode 9 oppose each other in the second direction D2.

Figure 23:
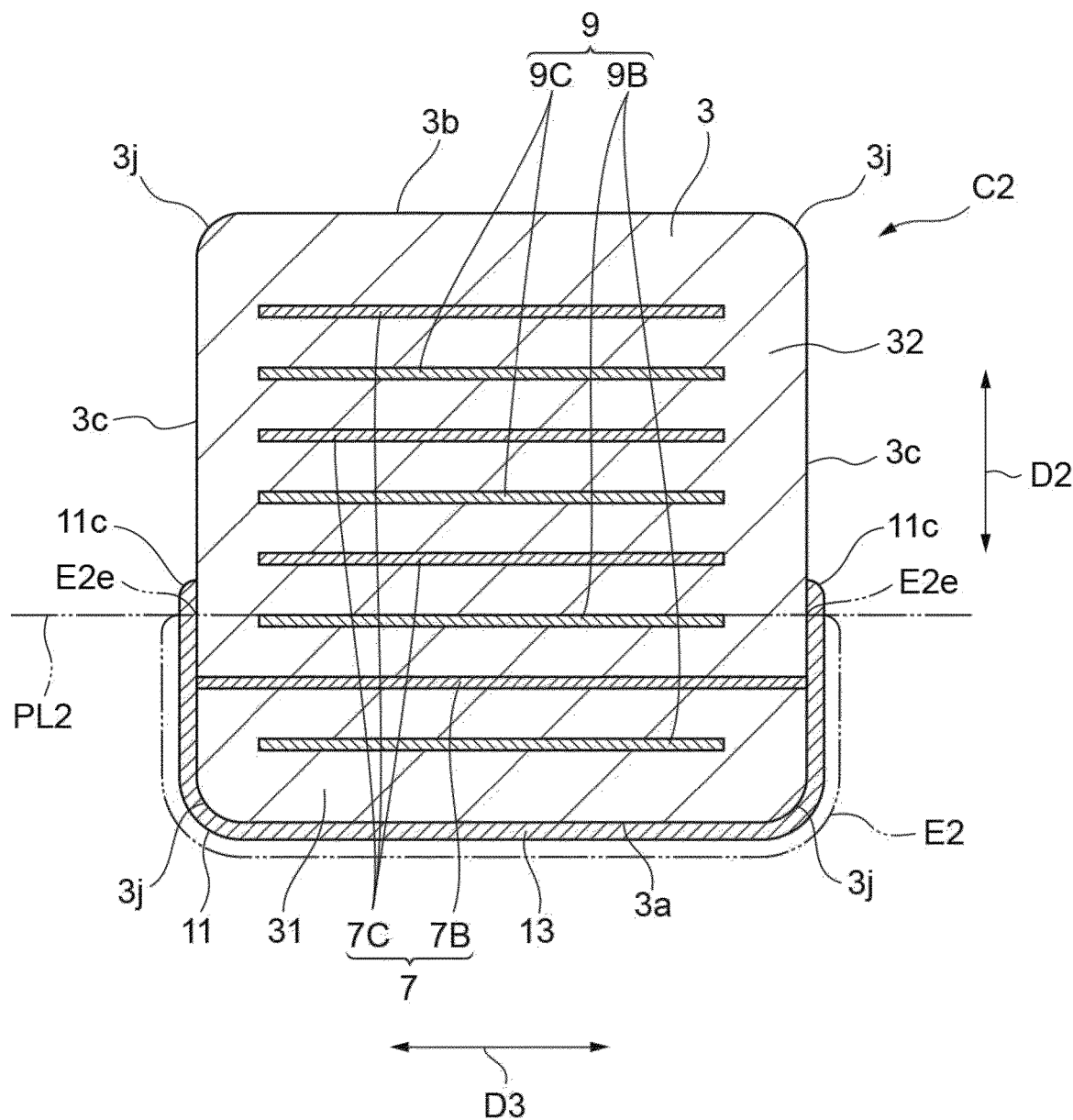
FIG. 23 is a view illustrating a cross-sectional configuration of the multilayer capacitor according to the other modified example of the second example.
Figure 24:
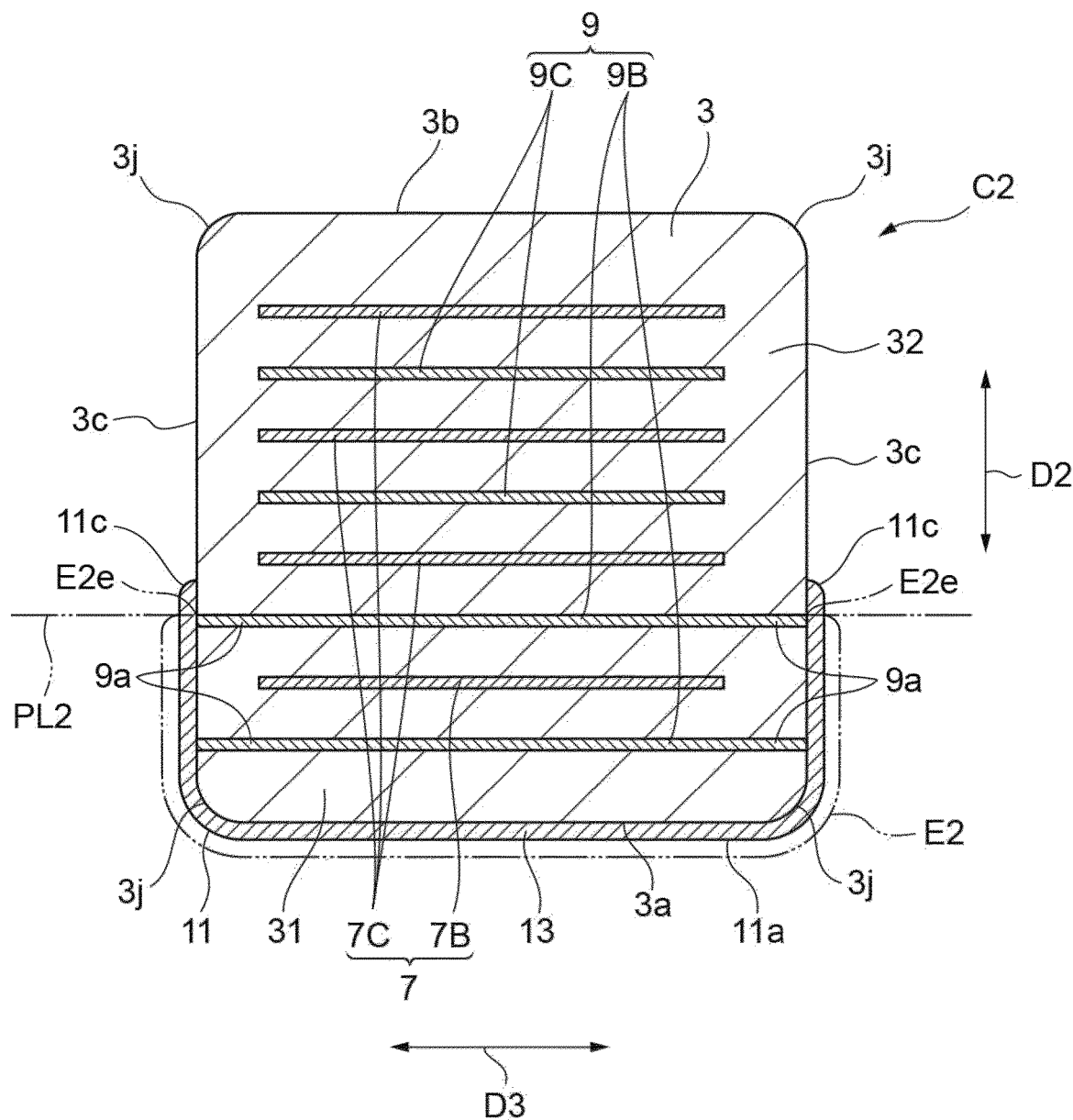
FIG. 24 is a view illustrating a cross-sectional configuration of the multilayer capacitor according to the other modified example of the second example.

As illustrated in FIGS. 23 and 24, the element body 3 includes a region 31 and a region 33. The region 31 is a region between a reference plane PL2 and the main surface 3a. The region 33 is a region between the reference plane PL2 and the main surface 3b. The reference plane PL2 includes, for example, end edges E2e of the second electrode layer E2 in the second direction D2. The reference surface PL2 may be substantially parallel to the main surfaces 3a and 3b. The end edges E2e include, for example, end edges of the second electrode layer E2 included in the region $5c_2$. The end edges E2e are included in the second electrode layer E2 and is located closer to the main surface 3b.

The plurality of internal electrodes 7 and 9 include a plurality of internal electrodes 7B and 9B located in the region 31 and a plurality of internal electrodes 7C and 9C located in the region 33. The plurality of internal electrodes 7B and 9B are located between the reference surface PL2 and the main surface 3a. The plurality of internal electrodes 7B and 9B are located between the end edges E2e and the main surface 3a, in the second direction D2. The plurality of internal electrodes 7C and 9C are located between the reference surface PL2 and the main surface 3b. The plurality of internal electrodes 7C and 9C are located between the end edges E2e and the main surface 3b, in the second direction D2.

The plurality of internal electrodes 7C and 9C are not physically connected to any of the pair of external conductors 11. Each internal electrode 7C does not include the connection portion 7a and is not exposed to the pair of side surfaces 3c. Each internal electrode 9C does not include the connection portion 9a and is not exposed to the pair of side surfaces 3c.

The internal electrode 7B is physically connected to the portion 11c included in the corresponding external conductor 11. The internal electrode 7B includes at least one connection portion 7a. All of the internal electrodes 7B may not be physically connected to the corresponding external conductor 11 (portion 11c). At least one internal electrode 7B may be physically connected to the corresponding external conductor 11.

The internal electrode 9B is physically connected to the portion 11c included in the corresponding external conductor 11. The internal electrode 9B includes at least one connection portion 9a. All of the internal electrodes 9B may not be physically connected to the corresponding external conductor 11 (portion 11c). At least one internal electrode 9B may be physically connected to the corresponding external conductor 11.

In the multilayer capacitor C2 according to the other modified example, each of the internal electrodes 7B and 9B is physically connected to the portion 11c included in the corresponding external conductor 11. Therefore, even in a configuration in which the internal electrode 7 and the internal electrode 9 oppose each other in the second direction D2, the multilayer capacitor C2 according to the other modified example reliably prevents migration from proceeding from the second electrode layer E2.

In the multilayer capacitor C2 according to the other modified example, the plurality of the internal electrodes 7B and 9B is not physically connected to the pair of external conductors 11.

Figure 25:
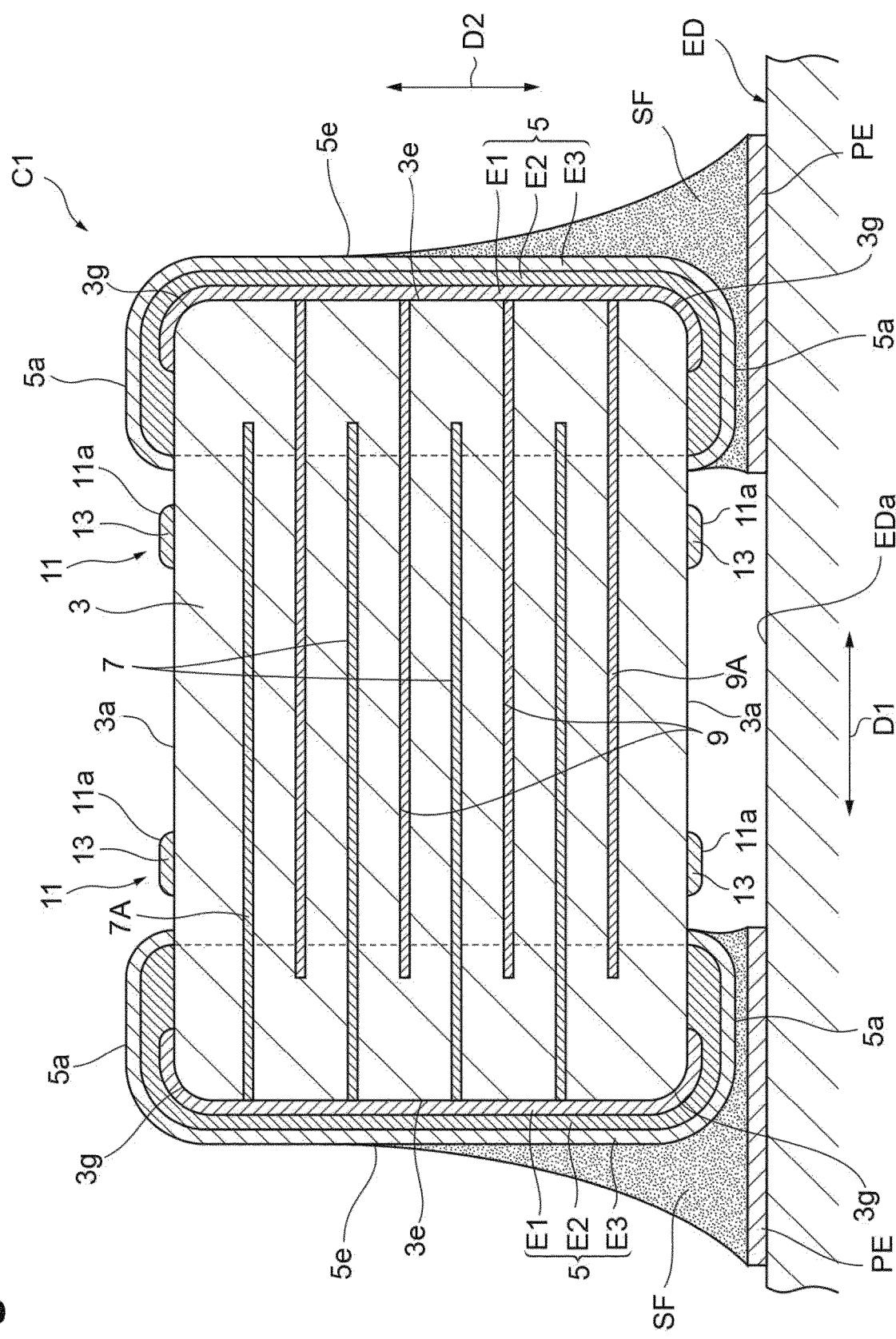
FIG. 25 is a view illustrating a cross-sectional configuration of an electronic component device including the multilayer capacitor according to the first example.

Next, a configuration of an electronic component device including the multilayer capacitor according to the first example will be described with reference to FIG. 25. FIG. 25 is a view illustrating a cross-sectional configuration of the electronic component device.

As illustrated in FIG. 25, the electronic component device includes the multilayer capacitor C1 and an electronic device ED. The electronic device ED includes, for example, a circuit board or an electronic component. The multilayer capacitor C1 is solder-mounted on the electronic device ED. The electronic device ED includes a main surface EDa and two pad electrodes PE. Each pad electrode PE is disposed on the main surface EDa. The two pad electrodes PE are separated from each other. The multilayer capacitor C1 is disposed on the electronic device ED in such a manner that the main surface 3a arranged to constitute the mounting surface and the main surface EDa oppose each other. Each of the internal electrodes 7 and 9 is located in a plane substantially parallel to the main surface EDa.

The electronic component device may include the multilayer capacitor C2 instead of the multilayer capacitor C1.

In solder-mounting the multilayer capacitor C1, the molten solder wets the external electrode 5 (third electrode layer E3). Solidification of the wet solder causes a solder fillet SF to be formed on the external electrode 5. The external electrodes 5 and the pad electrodes PE corresponding to each other are connected to each other through the solder fillet SF.

Each external conductor 11 is not physically connected to the electronic device ED. The electronic device ED does not include a land pattern to which each external conductor 11 is physically connected. Each outer conductor 11 is separated from the electronic device ED.

As described above, the electronic component device prevents migration from proceeding in the multilayer capacitor C1.

In the electronic component device, each external conductor 11 is not physically connected to the electronic device ED. Therefore, when an external force acts on the multilayer capacitor C1 from the electronic device ED, the external force does not act on the element body 3 through each external conductor 11.

The electronic device ED does not need to include a land pattern to which each external conductor 11 is physically connected. Therefore, the electronic component device prevents the configuration of the electronic apparatus ED from being complicated.

In the present specification, in a case where an element is described as being disposed on another element, the element may be directly disposed on the other element or be indirectly disposed on the other element. In a case where an element is indirectly disposed on another element, an intervening element is present between the element and the other element. In a case where an element is directly disposed on another element, no intervening element is present between the element and the other element.

In the present specification, in a case where an element is described as being located on another element, the element may be directly located on the other element or be indirectly located on the other element. In a case where an element is indirectly located on another element, an intervening element is present between the element and the other element. In a case where an element is directly located on another element, no intervening element is present between the element and the other element.

In the present specification, in a case where an element is described as covering another element, the element may directly cover the other element or indirectly cover the other element. In a case where an element indirectly covers another element, an intervening element is present between the element and the other element. In a case where an element directly covers another element, no intervening element is present between the element and the other element.

It is to be understood that not all aspects, advantages and features described herein may necessarily be achieved by, or included in, any one particular example. Indeed, having described and illustrated various examples herein, it should be apparent that other examples may be modified in arrangement and detail.

In the present examples and modified examples, the electronic component includes the multilayer capacitor. However, applicable electronic component is not limited to the multilayer capacitor. The applicable electronic component includes, for example, a multilayer electronic component such as a multilayer inductor, a multilayer varistor, a multilayer piezoelectric actuator, a multilayer thermistor, a multilayer solid-state battery component, or a multilayer composite component, or electronic components other than the multilayer electronic components.

What is claimed is:
1. An electronic component, comprising:
an element body including a first end surface and a second end surface opposing each other and a side surface coupling the first end surface and the second end surface;
a plurality of internal conductors in the element body;
a first external electrode on the first end surface and a second external electrode on the second end surface, each including an electrode layer in which migration is relatively prone to occur; and a first external conductor and a second external conductor disposed in a direction in which the first end surface and the second end surface oppose each other and separated from the first external electrode and the second external electrode, on the side surface, each including a conductor layer in which migration is less prone to occur than in the electrode layer, wherein the plurality of internal conductors includes a first internal conductor electrically connected to the first external electrode and the first external conductor and a second internal conductor electrically connected to the second external electrode and the second external conductor, the first internal conductor and the second internal conductor opposing each other in a direction orthogonal to the direction in which the first end surface and the second end surface oppose each other, the first external conductor is located between the first external electrode and the second external conductor, the second external conductor is located between the second external electrode and the first external conductor, and a first shortest distance between the first external electrode and the first external conductor and a second shortest distance between the second external electrode and the second external conductor are smaller than a shortest distance between the first external conductor and the second external conductor.

2. The electronic component according to claim 1, wherein the element body has a rectangular parallelepiped shape, the side surface includes a first side surface, a second side surface, a third side surface, and a fourth side surface that are adjacent to the end surface and the second end surface, and the first external conductor and the second external conductor are disposed over the first side surface, the second side surface, the third side surface, and the fourth side surface.

3. The electronic component according to claim 2, wherein the first side surface and the second side surface oppose each other, the first internal conductor is physically connected to a portion included in the first external conductor and located on the first side surface, and the second internal conductor is physically connected to a portion included in the second external conductor and located on the second side surface.

4. The electronic component according to claim 2, wherein the first internal conductor is physically connected to a portion included in the first external conductor and located on the first side surface, and the second internal conductor is physically connected to a portion included in the second external conductor and located on the first side surface.

5. The electronic component according to claim 1, wherein the first internal conductor is connected to the first external conductor at a plurality of portions of the first internal conductor, and the second internal conductor is connected to the second external conductor at a plurality of portions of the second internal conductor.

6. The electronic component according to claim 1, wherein the side surface includes a first main surface arranged to include a mounting surface, a second main surface opposing the first main surface, and a pair of side surfaces that are adjacent to the first main surface, the second main surface, the first end surface, and the second end surface and oppose each other, the electrode layer includes a conductive resin layer continuously covering a part of the main surface, a part of a corresponding end surface of the first end surface and the second end surface, and a part of each of the pair of side surfaces, the first internal conductor opposes the second internal conductor in a direction in which the pair of side surfaces oppose each other, and is physically connected to a portion included in the first external conductor and located on the first main surface, and the second internal conductor is physically connected to a portion included in the second external conductor and located on the first main surface.

7. The electronic component according to claim 6, wherein each of the first external conductor and the second external conductor is disposed over the first main surface and a portion of each of the pair of side surfaces.

8. The electronic component according to claim 7, wherein a first height of a portion included in each of the first external conductor and the second external conductor and located on the portion of each of the pair of side surfaces in a direction orthogonal to the first main surface is larger than or equal to a second height of the conductive resin layer in the direction orthogonal to the first main surface.

9. The electronic component according to claim 1, wherein the side surface includes a first main surface arranged to include a mounting surface, a second main surface opposing the first main surface, and a pair of side surfaces that are adjacent to the first main surface, the second main surface, the first end surface, and the second end surface and oppose each other, the electrode layer includes a conductive resin layer continuously covering a part of the main surface, a part of a corresponding end surface of the first end surface and the second end surface, and a part of each of the pair of side surfaces, the first internal conductor opposes the second internal conductor in a direction in which the first main surface and the second main surface oppose each other, and is physically connected to a portion included in the first external conductor and located on at least one side surface of the pair of side surfaces, and the second internal conductor is physically connected to a portion included in the second external conductor and located on at least one side surface of the pair of side surfaces.

10. The electronic component according to claim 9, wherein an internal conductor, among the plurality of internal conductors, between the second main surface and an end edge included in the conductive resin layer and located closer to the second main surface, in the direction in which the first main surface and the second main surface oppose each other, is not electrically connected to either the first external conductor or the second external conductor.

11. The electronic component according to claim 1, wherein
the electrode layer includes a conductive resin layer including a plurality of silver particles, and
the conductor layer includes a metal layer in which migration is less prone to occur than in silver.

12. An electronic component device, comprising:
the electronic component according to claim 1; and
an electronic device on which the electronic component is mounted,
the first external conductor and the second external conductor are not physically connected to the electronic device.

13. An electronic component, comprising:
an element body including a first end surface and a second end surface opposing each other and a side surface coupling the first end surface and the second end surface;
a plurality of internal conductors in the element body;
a first external electrode on the first end surface and a second external electrode on the second end surface, each including an electrode layer in which migration is relatively prone to occur; and
a first external conductor and a second external conductor disposed in a direction in which the first end surface and the second end surface oppose each other and separated from the first external electrode and the second external electrode, on the side surface, each including a conductor layer in which migration is less prone to occur than in the electrode layer,
wherein the plurality of internal conductors includes a first internal conductor electrically connected to the first external electrode and the first external conductor and a second internal conductor electrically connected to the second external electrode and the second external conductor,
the first external conductor is located between the first external electrode and the second external conductor,
the second external conductor is located between the second external electrode and the first external conductor,
the side surface includes a first main surface arranged to include a mounting surface, a second main surface opposing the first main surface, and a pair of side surfaces that are adjacent to the first main surface, the second main surface, the first end surface, and the second end surface and oppose each other,
the electrode layer includes a conductive resin layer continuously covering a part of the main surface, a part of a corresponding end surface of the first end surface and the second end surface, and a part of each of the pair of side surfaces,
the first internal conductor opposes the second internal conductor in a direction in which the pair of side surfaces oppose each other, and is physically connected to a portion included in the first external conductor and located on the first main surface,
the second internal conductor is physically connected to a portion included in the second external conductor and located on the first main surface,
each of the first external conductor and the second external conductor is disposed over the first main surface and a portion of each of the pair of side surfaces, and
a first height of a portion included in each of the first external conductor and the second external conductor and located on the portion of each of the pair of side surfaces in a direction orthogonal to the first main surface is larger than or equal to a second height of the conductive resin layer in the direction orthogonal to the first main surface.

14. An electronic component, comprising:
an element body including a first end surface and a second end surface opposing each other and a side surface coupling the first end surface and the second end surface;
a plurality of internal conductors in the element body;
a first external electrode on the first end surface and a second external electrode on the second end surface, each including an electrode layer in which migration is relatively prone to occur; and
a first external conductor and a second external conductor disposed in a direction in which the first end surface and the second end surface oppose each other and separated from the first external electrode and the second external electrode, on the side surface, each including a conductor layer in which migration is less prone to occur than in the electrode layer,
wherein the plurality of internal conductors includes a first internal conductor electrically connected to the first external electrode and the first external conductor and a second internal conductor electrically connected to the second external electrode and the second external conductor,
the first external conductor is located between the first external electrode and the second external conductor,
the second external conductor is located between the second external electrode and the first external conductor,
the side surface includes a first main surface arranged to include a mounting surface, a second main surface opposing the first main surface, and a pair of side surfaces that are adjacent to the first main surface, the second main surface, the first end surface, and the second end surface and oppose each other,
the electrode layer includes a conductive resin layer continuously covering a part of the main surface, a part of a corresponding end surface of the first end surface and the second end surface, and a part of each of the pair of side surfaces,
the first internal conductor opposes the second internal conductor in a direction in which the first main surface and the second main surface oppose each other, and is physically connected to a portion included in the first external conductor and located on at least one side surface of the pair of side surfaces,
the second internal conductor is physically connected to a portion included in the second external conductor and located on at least one side surface of the pair of side surfaces, each of the first external conductor and the second external conductor is disposed over the first main surface and a portion of each of the pair of side surfaces, and
a first height of a portion included in each of the first external conductor and the second external conductor and located on the portion of each of the pair of side surfaces in a direction orthogonal to the first main surface is larger than or equal to a second height of the conductive resin layer in the direction orthogonal to the first main surface.

* * * * *